(12) United States Patent
Yoshida et al.

(10) Patent No.: US 6,411,712 B1
(45) Date of Patent: Jun. 25, 2002

(54) DIGITAL BROADCAST RECEIVER

(75) Inventors: Osamu Yoshida, Kanagawa-ken; Hiroshi Machida, Saitama-ken, both of (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 09/179,317

(22) Filed: Oct. 27, 1998

(30) Foreign Application Priority Data

Oct. 27, 1997 (JP) ............................................. 9-294223
Nov. 21, 1997 (JP) ............................................. 9-321632
Jan. 16, 1998 (JP) ........................................... 10-006750

(51) Int. Cl.[7] ................................................ H04K 1/06
(52) U.S. Cl. ...................................................... 380/37
(58) Field of Search ................................ 713/151, 200, 713/201; 380/210, 211, 255, 200, 201, 239, 37, 42

(56) References Cited

U.S. PATENT DOCUMENTS 5,461,674 A * 10/1995 Citta ............................ 380/201
5,742,680 A *  4/1998 Wilson ........................ 380/227
5,933,500 A *  8/1999 Blatter et al. ................ 380/200

FOREIGN PATENT DOCUMENTS

JP          08191443         7/1996

* cited by examiner

Primary Examiner—David Ton
Assistant Examiner—Matthew Smithers
(74) Attorney, Agent, or Firm—Pillsbury Winthrop

(57) ABSTRACT

A digital broadcast receivers having a first unit for receiving broadcast signals transmitted from a transmitter, a second unit capable of removably coupling to the first unit for applying an operation specific to the second unit to the received signal, an encryptor equipped in the first unit for encrypting the received signal and for providing the encrypted signal to the second unit, and a decryptor equipped in the first unit for decrypting the signal encrypted by the encryptor transferred through the second unit.

5 Claims, 29 Drawing Sheets

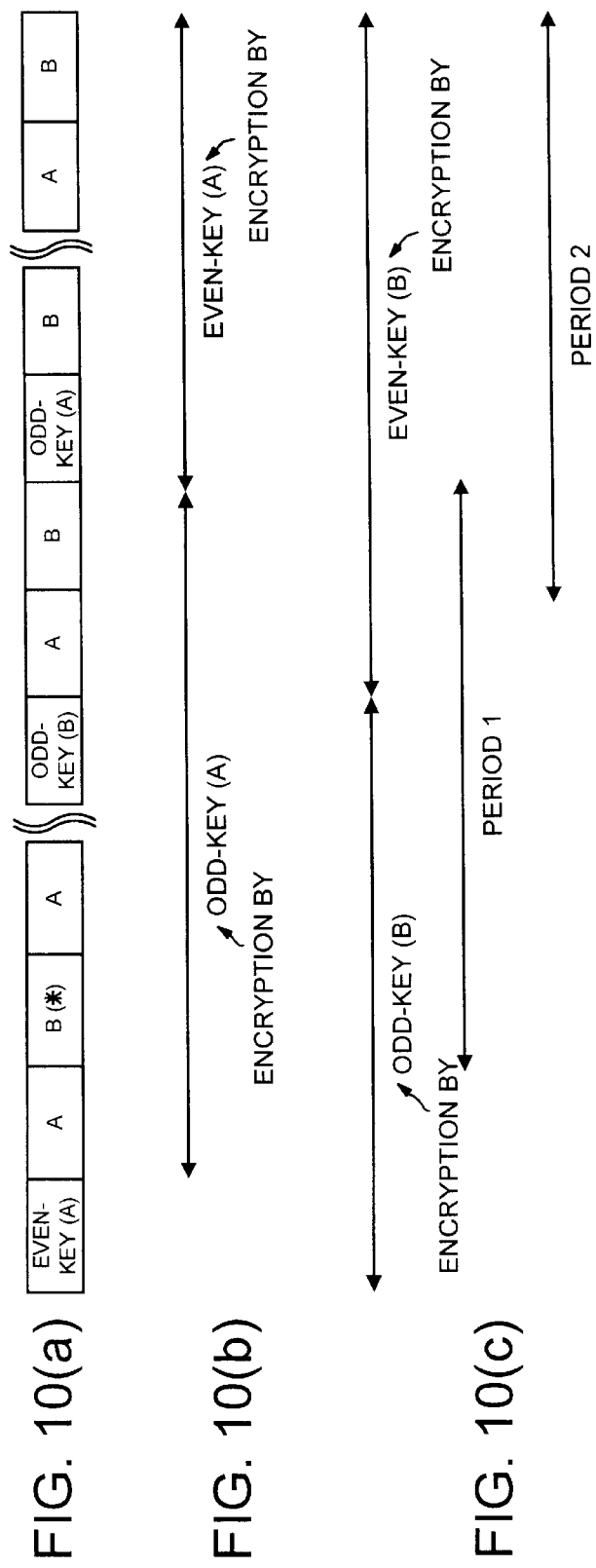

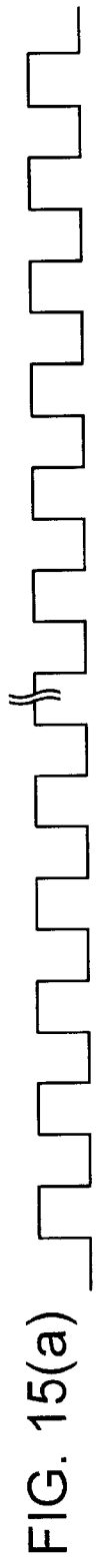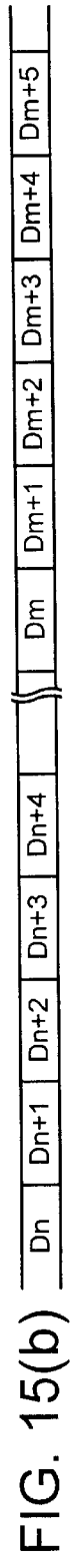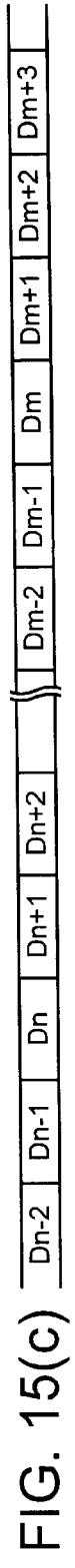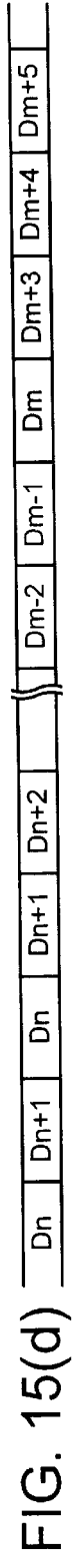
FIG. 15(a)
FIG. 15(b)
FIG. 15(c)
FIG. 15(d)
FIG. 15(e)
FIG. 15(f)
FIG. 15(g)

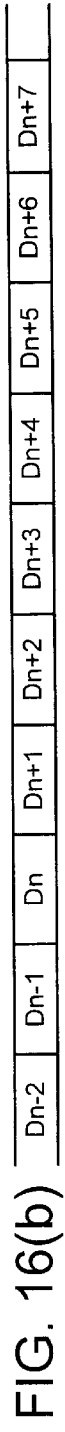
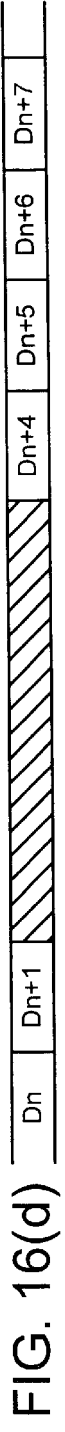
FIG. 16(a)
FIG. 16(b)
FIG. 16(c)
FIG. 16(d)
FIG. 16(e)
FIG. 16(f)
FIG. 16(g)

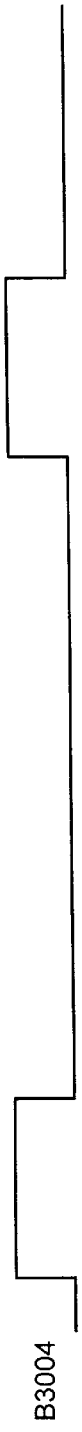

DIGITAL BROADCAST RECEIVER

The transmission frame pursuant to the DVB standard utilizes the MPEG 2 Transport Stream. This transport stream is arranged with a consideration for transmitting a plurality of program signals by one stream, so as that the transport stream can utilize a plurality of reference times. The transport stream comprises a 188 byte fixed length packet (transport packet) including one byte synchronizing signal (hereinafter referred to as SYNC). In the DVB standard, MPEG 2 SYNC is used directly as a synchronizing byte of the transmission frame.

In the DVB standard, the transport stream is applied with the encryption, such as a scramble. In this case, the encryption is applied in a unit of a 188 byte length transport packet-basis.

In a receiver pursuant to the DVB standard, an IC card may be used for the decryption, such as a descrambling. It becomes possible to make a plurality of broadcast signal receivers commonly usable when the decryption is carried out using an IC card.

As an interface standard in the DVB standard, there is the Common Interface Standard (EN50221) which defines the interface format between receivers and IC cards. This standard defines the signal communication between the receiver main unit and an IC card in viewing a subscription TV channel wherein an encrypted broadcast signal, such as a scrambled broadcast signal is received by the receiver main unit and the decryption (decoding) is carried out by an IC card.

FIG. 1 is a block diagram showing a conventional digital broadcast receiver using such IC cards. Herein, a receiver main unit A101 makes possible for users to view broadcast program by demodulating signals such as a satellite broadcast signal, a CATV broadcast signal, etc., supplied to an input terminal A104 and then supplying the demodulated signal to a TV receiver.

Generally, there are two type of programs in a broadcast system, i.e., free program broadcasts and subscription program broadcast. In case of the subscription TV channel, the broadcast signal is encrypted by being encrypted in the broadcast station side and transmitted to the receiving apparatus side. When the receiving apparatus belonged to a subscription user receives the broadcast signal transmitted by being encrypted, it decrypted the broadcast signal by decrypting within the IC card loaded to the receiver main unit, so that it decodes the signal and supplies to the television receiver. Accordingly, the user is possible to view the broadcast program which is processed the encryption.

Concretely, to a turner/demodulator A105, shown in FIG. 1, the digital broadcast signal, which is frequency, multiplexed and time division multiplexed is supplied via the terminal A104. The tuner/demodulator A105 selects the signal with a carrier frequency corresponding to the program signal selected by viewers, at the same time it demodulates it and supplies to an error corrector A106. Generally, on the transmission of the digital broadcast the error correcting code is added to the program signal. Accordingly, the error corrector A106 corrects the error of the broadcast signal on its transmission channel. Generally, the signal stream supplied from the error corrector A106 has a format conformable with the MPEG-SYSTEM (ISO/IEC13818-1) standard, time-division-multiplexing thereon a plurality of program signals. The signal stream is supplied to the signal processor 116 (decryptor) defined in an IC card A102, which is connected to the receiver main unit A101. The decryptor A116 decrypts the signal stream, and then supplies the decrypted signal stream back to the receiver main unit A101.

The decryption of the stream signal in the IC card A102 is carried out over a necessary portion on the stream signal where the encryption is needed, however, it is not carried out over the necessary portion. That is, the IC card A102 decrypts only program signals assigned by viewers among the stream signal wherein a plurality of program signals are multiplexed. However, it supplies the other to the receiver main unit without decryption.

Here, in the digital broadcast receiver, it is possible to connect the several IC card according to the several subscription TV systems. The input and output signals between these IC cards are coupled with each other in so-called a daisy-chain fashion. That is, the output signal from the error corrector A106 is decrypted as needed by the decryptor A116 of the IC card A102, and supplied to a selector A107 in the receiver main unit A101, then it is supplied to the IC card A103 via the selector A107 and supplied to a selector A108 in the receiver main unit A101 by being encrypted as needed by the decryptor A117 of the IC card A103.

In FIG. 1, the decryptor is shown as the function of the IC cards A102 and A103. However, at least two IC cards may be connected in the daisy-chain fashion, further, the application of the IC card may be the teletext receiving function or the external output interface.

Each of the IC cards A102 and A103 communicates between a controller A113 inside the receiver main unit A101 via each of controllers A118 and A119 in order to control each of the descrablers A116 and A117.

When the broadcast signal which is carried out the signal processing (decryption) by each the IC cards A102 and A103 is supplied to the receiver main unit A101, a demultiplexer A109 (demultiplexer) selects the required signal among the time division multiplexed broadcast signal and supplies it to an audio/video decoder A110. The audio/video decoder A110 denotes the digital compression encoded audio/video signal and supplies it to an audio/video output processor A111. The audio/video output processor A111 carries out a D/A conversion and a system conversion and supplies the broadcast signal to the television receiver via a terminal A112. Accordingly, viewers can view his/her favorite broadcast program.

The IC cards A102 and A103 are removable to the receiver main unit A101, so that viewers use the apparatus by removably coupling several kinds of IC cards according to the purpose. The loading/unloading of the IC cards A102, A103 is detected by each of IC card detectors A114 and A115 in the receiver main unit A101. The controller A113 in the receiver main unit A101 then controls the selectors A107 and A108 in response to the detection outputs from the IC card detectors A114, A115.

Concretely, when the unloaded status of both the IC cards A102 and A103 are detected by the IC card detectors A114 and A115 (in the case of that the IC card is not put on the receiver main unit A101), the controller A113 controls the selector A107 in order to select the broadcast signal, at the same time, it controls the selector A108 in order to select the broadcast signal via the selector A107. Accordingly, since the broadcast signal is supplied to the television receiver without encryption, viewers may not view his/her favorite broadcast channel.

Further, when the unloaded status of the IC card A102 is detected only in the IC card detector A114 (in case of that only the IC card A103 is put on the receiver main unit A101), the controller A113 controls the selector A107 in order to select the broadcast signal supplied from the error corrector A106, at the same time, it controls the selector A108 in order to supply the broadcast signal via the selector A107 to the IC card A103. Then, it controls the selector A108 in order to select the broadcast signal which is encrypted by the IC card A103. Accordingly, the broadcast signal which is decrypted according to the IC card A103 is supplied to the television receiver, so that viewers can view his/her favorite broadcast program.

Further, when the unloaded status of the IC card is detected in only the IC card detector 115 (in case of that only the IC card A102 is put on the receiver main unit A101), the controller A113 controls the selector A107 in order to supply the broadcast signal supplied from the error corrector A106 to the IC card A102, at the same time it controls the selector A108 in order to select the broadcast signal supplied from the selector A107. Then, it controls the selector A107 in order to select the broadcast signal that is decrypted by the IC card A102. Accordingly, the broadcast signal that is decrypted corresponding to the IC card A102 is supplied to the television receiver, so that viewers can view his/her favorite broadcast program.

Further, when the unloaded status of the IC cards A102 and A103 are not detected in the detectors A114 and A115 (in case of that both the IC cards A102 and A103 are put on the receiver main unit A101), the controller A113 controls the selector A107 in order to supply the broadcast signal supplied from the error corrector A106 to the IC card A102, at the same time it controls the selector A107 in order to select the broadcast signal that is decrypted by the IC card A102. Then, the controller A113 controls the selector A108 in order to supply the broadcast signal supplied from the selector A107 to the IC card A103, at the same time, it controls the selector A108 in order to select the broadcast signal that is decrypted by the IC card A103. Accordingly, the broadcast signal that is decrypted to the IC cards A102 or A103 is supplied to the television receiver, so that viewers can view his/her favorite broadcast program.

By the way, the receiver unit A101 and the IC cards A102, A103 are coupled each other by loading the IC cards A102, A103 into the receiver main unit A101. Then it is possible to take out the received signal outside the receiver main unit A101 and the IC cards A102, A103, from connectors on the receiver main unit A101 or the IC cards A102, A103. In other words, digitized broadcast signals appear directly on the IC card interface portion between the receiver main unit A101 with the IC cards A102, A103 and therefore, there was the possibility that an unauthorized copying might be made.

Further, as it is so designed that IC cards feed the decrypted signal back to the receiver main unit A101, even in case of an encrypted subscription TV program, it is possible to extract the decrypted signal from the outputs of the IC cards A102, A103 and there was the possibility that the unauthorized copying might be made.

As described above, the conventional digital broadcast apparatus is used by removably coupling the IC cards A102 and A103 freely to the receiver main unit A101. Generally, as signal processors in IC cards, e.g., decryptors A116 and A117 reuire some length of time for processing signals, there is cused same amount of delay times between inputs and outputs of the IC cards A102 and A103. Accordingly, there are some phase differences between the signal supplied to the IC card and the signal supplied from the IC card. Further, when the selectors A107 and A108 select the broadcast signals directly supplied thereto or the broadcast signals processed in the IC cards A102 and A103, there occurs a noise as well as a disruption of synchronization at the instant that the selectors A107 and A108 operate. The error data is transferred to the next step by added to the broadcast signal.

Since the IC cards A102 and A103 in the next step connected in the daisy-chain fashion or the processor such as the demultiplexer in the receiver main unit perform the broadcast signal to which the broadcast signal having the phase differences on the error data, it had a problem to cause the malfunction or loss of synchronization.

And, since it takes the time for judgement in the IC card detectors A114 and A115 in case of that the user takes the IC card off, it had problems that the it generates the error data till the IC card is take off, the unloading of the IC card is detected in the IC card detectors A114 and A115, and the controller A113 controls the selectors A107 and A108, at the same time it causes the malfunction of the circuit in the next step.

As described above, in the conventional digital broadcast receiver, a plurality of IC cards can be used to freely load to or unload from the receiver main unit. However, since the signal processor (decryptor) in the IC card requires some time for the signal processing, it disadvantageously causes a delay in inputting and outputting of signals. Accordingly, there are some amount of phase difference between the signal bypassing IC cards and the signal supplied through IC cards. When the selector selects either of the signals, there occurs a noise and/or a disruption of synchronization. The signal accompanied with the noise then propagates to later stages. Since the latter stage IC card which is connected to the leading stage IC card in the daisy-chain fashion or the signal processor such as the demultiplexer A109 in the receiving apparatus process the signal input to which the error data are added, it has a problem to cause the malfunction or the synchronization deterioration.

Then, since it takes some time for the IC card detector to determine the presence of the IC card in case that the user removes the IC card, it had problems that it causes the error, and following stages operate the malfunctions till the IC card detects that there is no IC card and the controller controls the selector.

Further, since whole signals are applied via the IC card in such a construction, there is some possibilities of problems mentioned above caused by loading or removing the IC card while the user is watching the free program signal or program signal which is using other decryption system.

SUMMARY OF THE INVENTION

The present invention has been made in view of the problem described above, and it is an object to provide a digital broadcast receiver capable of preventing the unauthorized use of signals appearing on the IC card interface portion between the receiver main unit and IC cards.

The present invention has an object to remove the drawbacks in the conventional apparatus. That is the present invention has an object to provide a digital broadcast receiver which corrects the phase difference between the broadcast signal which is carried out the signal processing by the IC card and one which is not carried out the signal processing, and prevents to generate the error data which occurs at an instance of loading/unloading of the IC card so as to prevent making the malfunction in the signal processor which is connected in daisy-chain fashion or the in the next step circuit.

Another object of the present invention is to prevent the malfunctions of IC cards or processors caused by noise or data error occurring at the time of selecting between signals output from IC cards and signals bypassing the IC cards, or at the time of removing IC cards.

A first aspect of the digital broadcast receivers according to the present invention includes, a first unit for receiving broadcast signals transmitted from a transmitter, a second unit capable of removably coupling to the first unit for applying an operation specific to the second unit to the received signal, an encryptor equipped in the first unit for encrypting the received signal and for providing the encrypted signal to the second unit, and a decryptor equipped in the first unit for decrypting the signal encrypted by the encryptor transferred through the second unit.

In the present invention, the encryptor applies the encryption to broadcast signals input to the first unit and then supplies the encrypted signals to the second unit. The first and the second units can be separated each other. It is possible to take out the input/output of the first and the second units through the IC card interface between these units but these input and output are encrypted. The output of the second unit is given to the decryptor and the encryption applied by the encryptor is decrypted.

A second aspect of the digital broadcast receivers according to the present invention includes, a disabling signal generator for detecting an ineffective portion of the broadcast signal which is supplied to each packet by added with an ineffective code which is ineffective to decode a synchronizing signal and a broadcast signal, and for generating a disabling signal at the timing that ineffective portion has been detected, at least one removable signal processor for performing a predetermined signal processing to the broadcast signal, a selector for selecting either of the broadcast signal which is directly supplied thereto or the broadcast signal which is supplied thereto after processed in the signal processor, a selector controller for controlling the selector in response to the disabling signal, and a decoder for decoding the broadcast signal supplied via the selector as ineffective one by the disabling signal.

In the digital broadcast receiver according the second aspect of the present invention, the ineffective code which is ineffective to decoding of the synchronizing signal and the broadcast signal is added to the received broadcast signall. The ineffective code in the received signal is then detected by packet basis. The disabling signal is then generated at the timing of detecting the ineffective code. In response to the disabling signal the selection controller controls the selector to select the signal directly supplied thereto or the signal supplied thereto through at least one signal processor which is removably coupled to the receiver main unit for processing the broadcast signal in a predetermined fashion. The decoder decodes the signal supplied thereto through the selector.

Accordingly, it is possible to control the selector at the signal portion which is ineffective to the nature of the original video and or audio information. It is thus possible to prevent the inconvenience that the selector causes the decoder in later stage to make the malfunction.

A third aspect of the digital broadcast receivers according to the present invention includes at least one removable second apparatus, which is connected in daisy-chain fashion via first apparatus, where the digital broadcast signal which is received and demodulated in the first apparatus or the demodulated digital broadcast signal which is obtained from outside of the first apparatus is output to the second apparatus where the signal is carried out a predetermined signal processing and again supplies the signal to the first apparatus, then the signal is decoded in the first apparatus, and further includes at least one first delay unit for outputting a bypass signal which the signal equal to the signal output to the second apparatus from the first apparatus is delayed in the first apparatus, at least one second delay unit for delaying the signal which is input to the first apparatus from the second apparatus, at least one selector for selecting the output signal supplied from the first delay unit or the second delay unit, and delay time adjuster for adjusting the delay time in the second delay unit in order that the sum of the delay time in the second apparatus and the delay time in the second delay unit will be equal to the delay time in the first delay unit.

A fourth aspect of the digital broadcast receivers according to the present invention includes at least one removable second apparatuses, which is connected in the delay-chain fashion via a first apparatus, where the digital broadcast signal which is received and demodulated in the first apparatus or the demodulated digital broadcast signal which is obtained from outside of the first apparatus is output to the second apparatus where the signal is carried out a predetermined signal processing again supplies the signal to the first apparatus, then the signal is decoded in the first apparatus, and further includes at least one selector for selecting the signal bypassing the second apparatus and the signal supplied through the second apparatus, an extractor for extracting the attribute information of the program signal from the digital broadcast signal, a determination unit for analyzing the information extracted in the extractor and determining the possibility of the necessity of the signal processing in the second apparatus, and a second controller for making the selector to select output signals from the second apparatus when the determination unit has determined that a signal processing at the second apparatus is needed.

In the digital broadcast receivers according to the third and fourth aspect of the present invention, it is possible to prevent that a noise and/or data error occurring in the stream of signals at the timing of selecting the signal directly supplied to the selector or the signal supplied to the selector through the leading second unit causes a malfunction in the latter stage second units or the first unit.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings: wherein:

FIGS. 10(a) to 10(c) are diagrams for explaining the operation of the embodiment of the digital broadcast receiver, as shown in FIG. 9;

FIGS. 15(a) to 15(g) are timing charts for explaining the operation of the second embodiment of the digital broadcast receiver according to the second aspect of the present invention, at instances of operations of the second and the third selectors;

FIGS. 16(a) to 16(g) are timing charts for explaining the operation of the second embodiment of the digital broadcast receiver according to the second aspect of the present invention, at instances of loading/unloading of the IC cards;

FIGS. 23(a) to 23(e) are timing charts for explaining the operations of the first and the second embodiments of the digital broadcast receiver according to the third aspect of the present invention;

DESCRIPTION OF THE PREFERRED EMBODIMENTS

Figure 2:
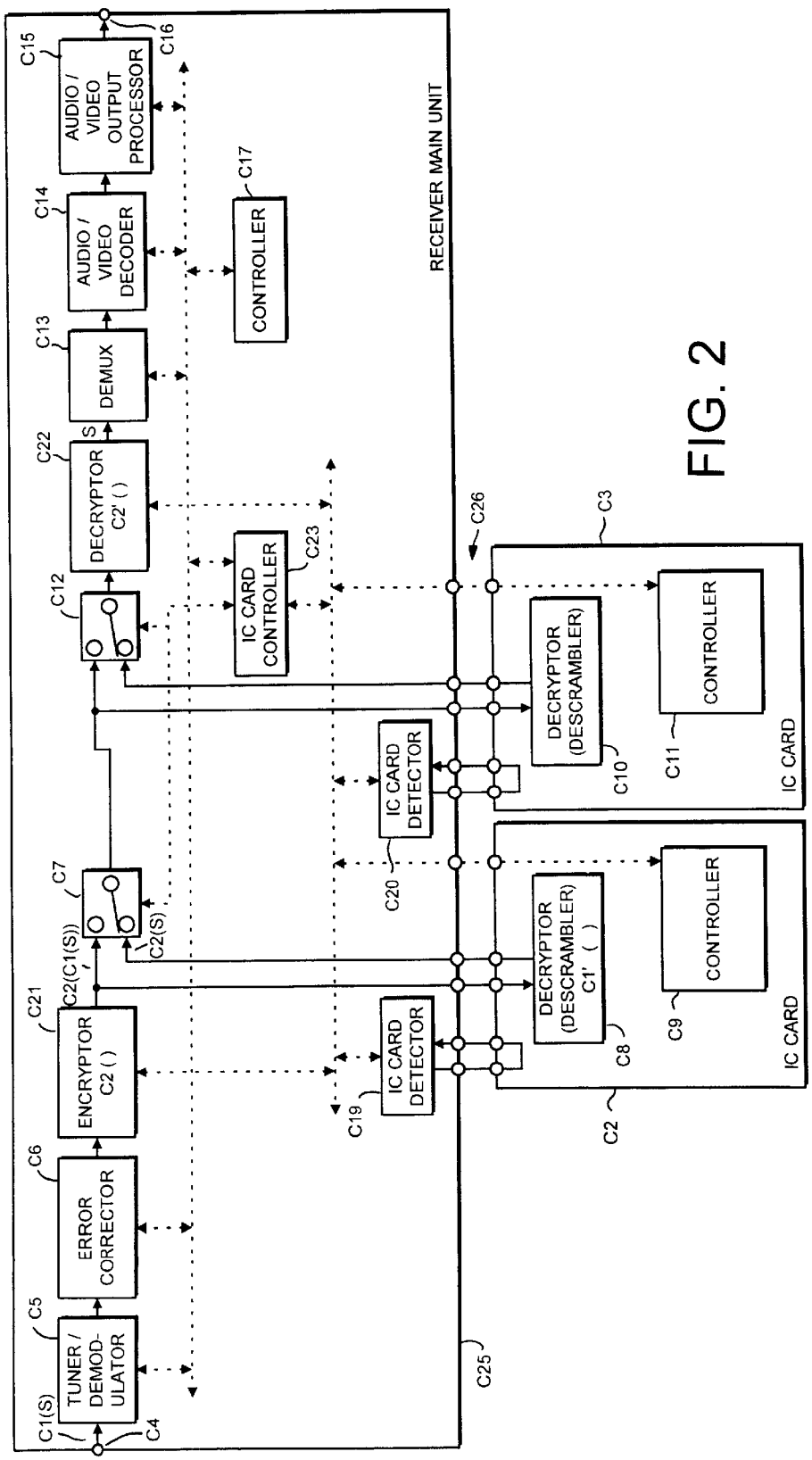
FIG. 2 is a block diagram showing a first embodiment of the digital broadcast receiver according to the first aspect of the present invention.
Figure 3:
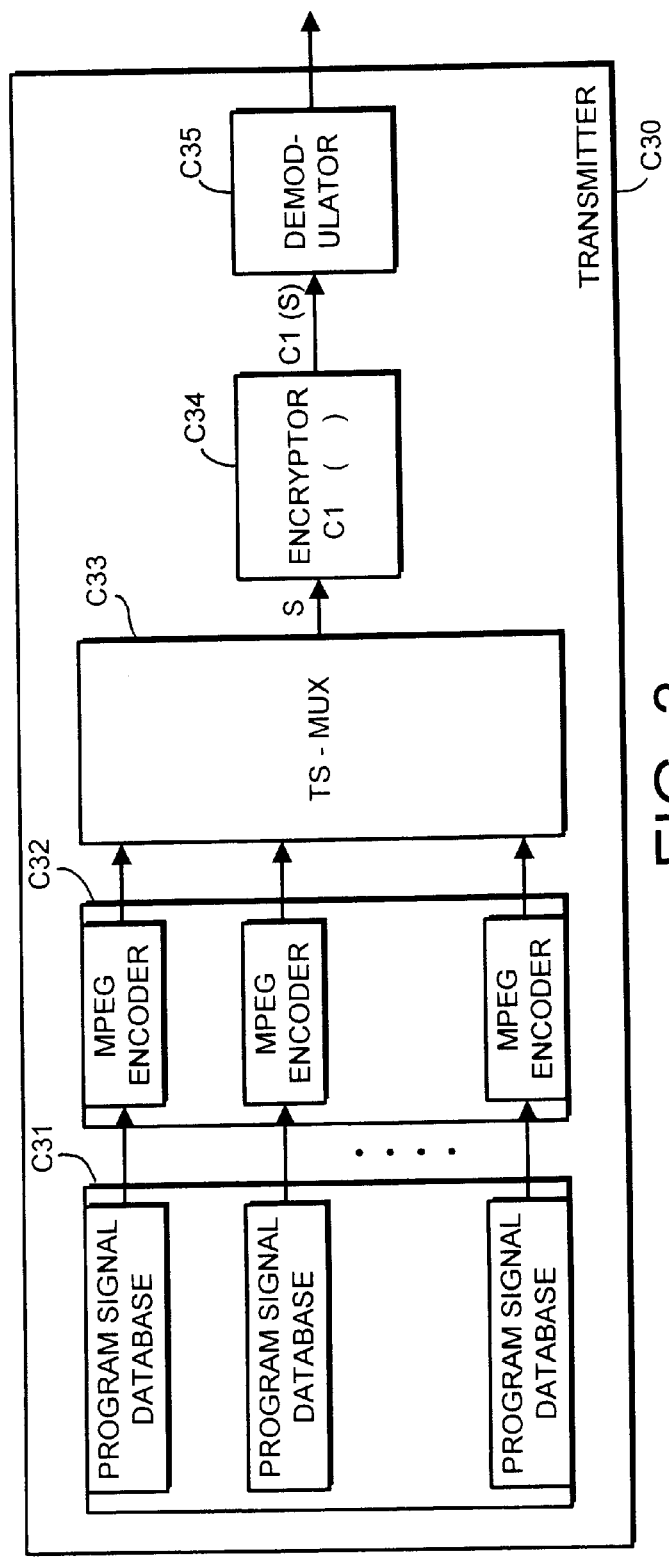
FIG. 3 is a block diagram showing a transmitter.

Hereinafter, certain embodiments of digital broadcast receiver according to the first aspect of the present invention will be described in detail in reference to the attached drawings, FIGS. 2 to 11. FIG. 2 is a block diagram showing a first embodiment of the digital broadcast receiver according to the first aspect of the present invention. FIG. 3 is a block diagram showing a digital broadcast transmitter. In FIG. 2, broken lines represent a bus system.

The embodiment of FIG. 2 illustrates a digital broadcast receiver wherein two IC cards is utilized for decrypting a received broadcast signal which has been encrypted in a transmitter. In this embodiment, a receiver main unit C25 is provided with an encryption capability which is different from the encryption format given in transmitter.

Now, a transmitter C30 in a broadcast station will be described in reference to FIG. 3.

The transmitter C30 has a group of TV program database each storing therein a plurality of program signals comprised of video and audio signals. A program signal read out of each database in the group of TV program databases C31 is supplied to each MPEG encode in a group of MPEG encoders C32.

Each MPEG encoder MPEG-encodes the program signal input thereto and then provides the MPEG-encoded program signal to a transport stream multiplexer (hereinafter referred to as TS-MUX) C33. The TS-MUX C33 multiplexes a plurality of program signals that are supplied from the plurality of MPEG encoders into a transport stream by a unit of packet-basis and then provides it to an encryptor C34.

The encryptor C34 encrypts the transport stream input thereto by a unit of program-basis. For instance, in case of subscription TV programs, the encryptor C34 encrypts program signals. Further, the encryption by the encryptor C34 is expressed by an encryption function C1().

Therefore, assuming the output of the TS-MUX is S, the output of the encryptor C34 is expressed by C1(S).

The output of the encryptor C34 (C1(S)) is supplied to a modulator C35. The modulator C35 modulates encrypted program signal according to such media as satellite broadcast, ground wave broadcast and CATV broadcast, etc. and transmits broadcast signals to the transmission line.

In FIG. 2, broadcast signals transmitted over a transmission channel (not shown) are input to the input terminal C4 and supplied to a tuner/demodulator C5.

The tuner/demodulator C5 selects and demodulates broadcast signal of a specified frequency from the input broadcast signals and then supplies the demodulated signal to an error corrector C6. The error corrector C6 makes the error correction of the input signal and obtains program signal before the modulation at the transmitter side.

In this embodiment, the output of the error corrector C6 is supplied to an encryptor C21. The encryptor C21 encrypts the output of the error corrector C6 and the supplies the encrypted signal to a selector C7 and an IC card interface C26.

When the encryption of the encryptor C21 is expressed in function C2(), the output of the encryptor C21 is expressed by C2 (C1(S)). The encryption function C1() applied in the transmitter side and the encryption function C2() applied in the encryptor C21 of the receiver main unit C25 are defined for the process wherein the commutative low is held. That is, they are defined for the process to satisfy the following expression:

$$C1(C2()) = C2(C1())$$

Figure 1:
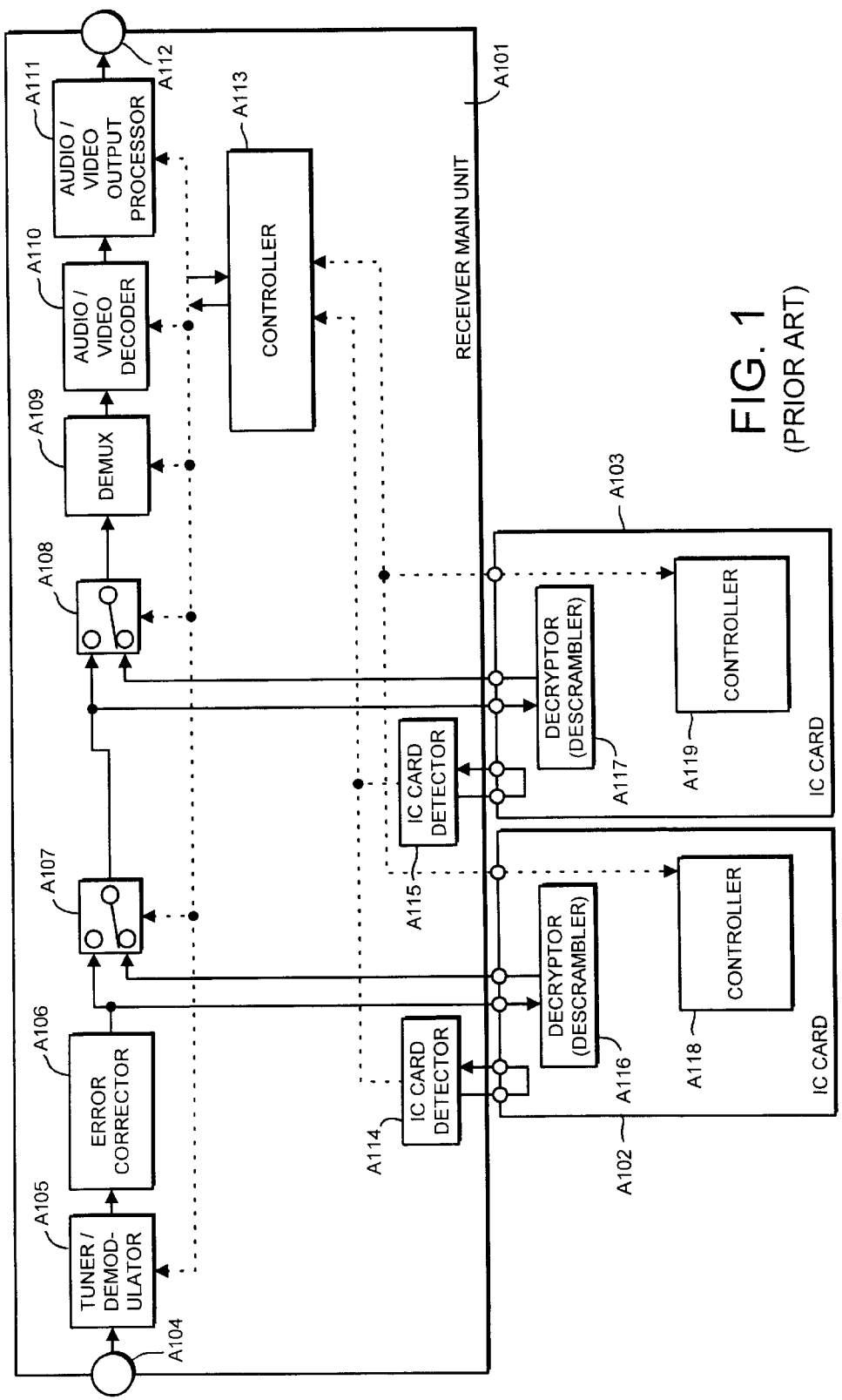
FIG. 1 is a block diagram showing a conventional digital broadcast receiver.

The IC card interface C26 has card alots (not shown), enabling it to connect the receiver main unit C25 to the IC cards C2, C3. The IC card interface C26 is arranged like that of the conventional example, as shown in FIG. 1, and the data input/output in the daisy chain fashion between a plurality of IC cards is made possible.

The IC card C2 has a signal processor C8 and a controller C9. The controller C9 controls the signal processor C8 by communicating with an IC card controller C29 which will be described later. The signal processor C8 has, for instance, a decryption feature for decrypting pay program signals supplied through the IC card interface C26 and then outputting the decrypted signal to the receiver main body C25 through the IC card interface C26. In this embodiment, the decryption of the signal processor C8 is expressed by function C1'(). And the function C2() and C1'() are defined for the process where the commutative low is held.

The encryption functions C1() and C1'() have the relation of Equation (1) shown below.

$$C1'(C1(S)) = S \qquad (1)$$

As the encryption functions C1() and C1'() are defined for the process where the commutative low is held, it is seen from the encryption applied in the transmitter aide is decoded by the decryption by the IC card C2. That is, the encryption at the transmitter side and the decryption by the IC card C2 are the reversible processes. On the other hand, the encryption added in the receiver main unit C25 is not decoded.

The IC card C3 having an arrangement the same as the IC card C2, includes therein a controller C11 which controls the decryption by communicating with the IC card controller C23 and a signal processor C10 which operates as a decryptor.

There are provided with IC card detectors C19, C20 on the receiver main unit C25. The IC card detectors C19, C20 detect whether IC cards C2 nd C3 are loaded in the receiver main unit C25. The detected results are then supplied to the IC card controller C23.

The IC card controller C23 controls selectors C7, C12 respectively, based on the detected results of the IC card detectors C19, C20. In other words, when the IC card detector C19 detected that an IC is loaded, the IC card controller C23 have the selector C7 outputs the output of the IC card interface C26 and when an IC card is not loaded, have the selector C7 outputs the output of the encryptor C21. Further, when the IC card detector C20 detects that an IC card is loaded, the IC card controller C23 have the selector C12 outputs the output of the IC card interface C26 and where an IC card is not loaded, have the selector C12 outputs the output of the selector C7.

The selectors C7, C12 are controlled by the IC card controller C23 to select one of two inputs to the selector C12 and a decryptor C22, respectively. The decryptor C22 decrypts the input program signal and the supplies the decrypted signal to a demultiplexer (referred to as DEMUX) C13. The decryption of the decryptor C22 is expressed by function C2'().

The functions C2() and C2'() have the relation of Equation (2) described later, and by this relation, the encryption added in the receiver main unit C25 is decoded.

The output of the decryptor C22 is supplied to the DEMUX C18. The DEMUX C13 selects user's favorite program signal from the time division multiplexed input signal stream and then supplies the selected program signal to an audio/video decoder C14. The audio/video decoder C14 decodes digital compression coded audio/video signal and supplies the decoded signal to an audio/video output processor C15. The audio/video output processor C15 obtains analog video signals through the D/A conversion process and the system conversion process, etc. When this video signal is supplied to a display (not shown) through a terminal C16, a user's favorite program signal can be viewed. Further, a controller C17 controls the tuner/demodulator C5 through the audio video output processor C15, and also controls the communication with the IC card controller C23.

Further, when the IC card detector C19, C20 detected that the IC cards C2, C3 were not loaded, the IC card controller C23 stops the operations of the encryptor C21 and the decryptor C22, respectively.

Now, the operation of the embodiment configured as mentioned above will be described.

It is assumed that he processes of the encryptor C34, of the transmitter C30, the encryptor C21 at the receiver side, the signal processor C8 and the decryptor C22 of the IC card C2 are expressed by functions C1(), C2(), C1'() and C2'(), respectively. These functions satisfy the above Equation (1), and also Equations (2) through (5).

$$C2'(C2(S)) \times S \qquad (2)$$
$$C1(C2(S)) \times C2(C1(S)) \qquad (3)$$
$$C1'(C2(S)) \times C2(C1(S)) \qquad (4)$$
$$C1(C2'(S)) \times C2'(C1(S)) \qquad (5)$$

Equations (1) and (2) indicate the relation of the encryption and the decryption. Then it is indicated that the encryption by the function C1(), C2() can be decrypted by the functions C1'() and C2'(), respectively. Further, Equations (3) through (5) indicate that the functions C1(), C1'() and the functions C2() and C2'() are related in that the commutative low is held. Further, Equation (5) is not an indispensable condition.

The TS-MUX C33 at the transmitter side produces an MPEG standard transport stream S and then supplies the transport stream S to an encryptor C34. The encryption is applied to the transport stream by the encryptor C34. At the transmitter side, the following Equation (6) is formed.

$$\text{Output of encryptor } C34 \times C1(S) \qquad (6)$$

The output of the encryptor C34 is modulated by the modulator C35 and transmitted to the transmission line as the broadcast signal.

On the other hand, at the receiver side, the IC card C2 having the decryptor function against the encryptor C34 is to be loaded in the receiver main unit C25. Further, the IC card C3 is used for other functions than the decryption against the encryptor C34.

The broadcast signal transmitted through the transmission line is supplied to the tuner/demodulator C5 through the terminal C4 of the receiver main unit C25. The tuning and the demodulation are carried out by the tuner/demodulator C5, the error correcting process is carried out by the error corrector C6 and the original program signal before the modulation at the transmitter side is restored.

The encryptor C21 encrypts the output (C1(S)) of the error corrector C6 by the function C2(). This output of the encryptor C21 is supplied to the IC card C2 through the IC card interface C26. The output of the encryptor C21 transmitted to the IC card interface C26 is expressed by Equation (7) shown below.

$$\text{Input to IC card } C2 \times C2(C1(S)) \quad (7)$$

The signal processor C8 of the IC card C2 carries out the decryption by the function $C1'(S)$. The output of the signal processor C8 is given by Equation (8) shown below.

$$\text{Output of IC card } C2 \times C1'(C2(C1(S))) \quad (8)$$

Equation (8) is deformed to Equation (9) shown below by Equations (1) through (5):

$$\text{Output of } IC \text{ card } C2 = C1'(C2(C1(S))) \quad (9)$$
$$= C2(C1'(C1(S)))$$
$$= C2(S)$$

Thus, the IC card C2 encrypts the original program signal S with the function C20. The encrypted output is supplied to the selector C7 through the IC card interface C26.

In this case, the selector C7 outputs the output of the IC card interface C26 to the selector C12 via the IC card C3 under the control of the IC card controller C23. Further, the selector C12 supplies the output of the IC card C3 to the decryptor C22 under the control of the IC card controller C23.

The decryptor C22 decrypts the input program signal suing the function $C2'()$. That is, the output of the decryptor C22 is expressed by Equation (10) shown below.

$$\text{Output of Decryptor} = C2'(C2(S)) \quad (10)$$
$$= S$$

Thus, the output of the TS-MUX C33 at the transmitter side is restored by the decryptor C22. This transport stream is supplied to the DEMUX C13, where user's favorite program signal only is extracted and then supplied to the audio/video decoder C14. The program signal is decoded by the audio/video decoder C14. Thus analog video and audio signals are obtained by the audio/video output processor C15. When the output of the audio/video output processor C15 is supplied to a display through the terminal C16, a user's favorite program signal can be viewed.

Thus, in this embodiment it is possible to carry out an encryption specific to the receiver main unit and differs at from the encryption in the transmitter side. Thus a signal encrypted in specific to the receiver main unit is output through the IC card interface. By making the encryption at the receiver main unit reversibly to the encryption at the transmitter side, it is possible to reset the encryption applied in the transmitter side within the IC cards, while it is possible to reset the encryption applied in the receiver main body by the decryptor provided in the receiver main unit. As the signal that can be taken out through the IC card interface is encrypted in specific to the receiver main unit, the output signal itself cannot be used by unauthorized users. Thus, the unauthorized use of data from the IC card interface can be prevented.

Further, in this embodiment an example using two IC cards for the decryption is shown, however, it is clear that the functions of IC cards are not limited to the decryption but are applicable to a case where at least three IC cards are used.

Figure 4:
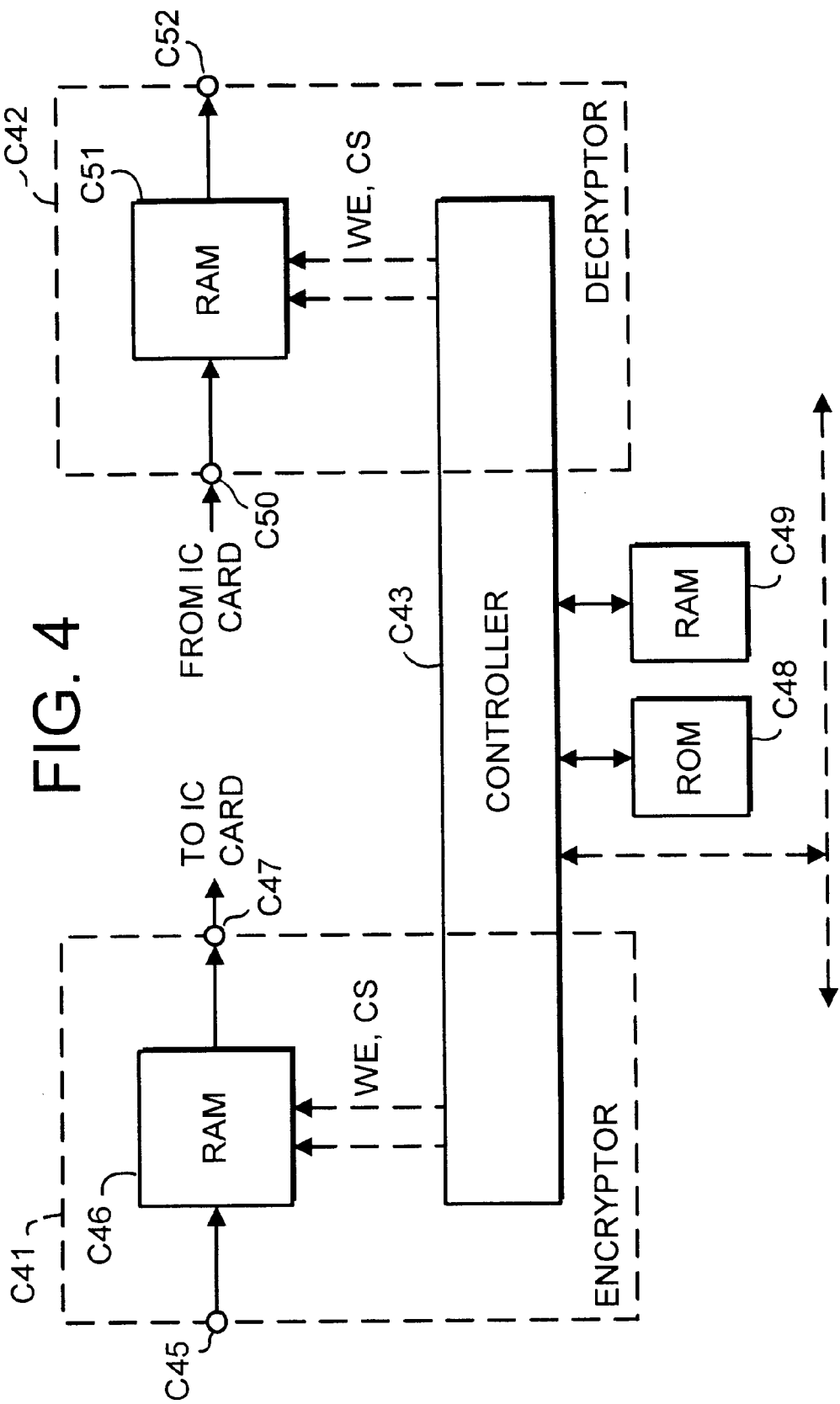
FIG. 4 is a block diagram showing a second embodiment of the digital broadcast receiver according to the first aspect of the present invention.

FIG. 4 is a block diagram showing a second embodiment of the digital broadcast receiver according to the first aspect of the present invention. The embodiment of FIG. 4 exemplarily shows a receiver main unit including an encryptor and a decryptor. In FIG. 4, the combination of an encryptor C41 and a controller C43, and the combination of a decryptor C42 and a controller C43 correspond to the combination of the encryptor C21 and the decryptor C22, as shown in FIG. 2, respectively. Other elements of the receiver main unit are the same as those, as shown in FIG. 2, and the illustration thereof will be omitted. The broken line in FIG. 4 indicates the bus. Further, when a signal received and then demodulated by external equipments is input, the tuner/demodulator C5 and the error corrector C6, etc. are not needed.

In the current digital broadcast, block encryption functions such as a "DES" (datan encryption standard), "MULTI-2", etc. are often used as the function C1. From the characteristic of these cryptographic systems, the encryption of the transport stream is basically carried out by a unit of packet-basis (188 bytes).

As an example of the function C2 which holds the commutative low with the function C1, in this embodiment, by utilizing this characteristic, the encryption is carried out according to the packet shuffling for shuffling packets in a proper sequence.

In FIG. 4, program signal from the error corrector C6 is supplied to a terminal C45 of an encryptor C41. This encryptor C41 comprises a RAM C46 and a controller C43. The controller C43 supplies writing and reading addresses to the RAM46 and generates a write enable signal (WE) and a chip selection control signal (CS).

The RAM C46 stores input program signal in a designated address under the control of the controller C43. In this case, the controller C43 stores the program signal into the RAM C46 sequentially by every packet. Further, the RAM C46 reads out the program signal stored with the address designated by the controller C43, and then outputs the program through a terminal C47.

In this case, the controller C43 generates addresses to read the program signal stored in the RAM C46 by every packet in random order. As a result, a program signal which is packet-shaffled is output from the encryptor C41. The program signal output through the terminal C47 is supplied to the IC card C2 via the IC card interface C26 (see FIG. 2).

The output of IC card is supplied to a terminal C50 of a decryptor C42 through the IC card interface C26 and the selector C12. The decryptor C42 has an arrangement the same as that of the encryptor C41. The decryptor C42 comprises a RAM C51 and the controller C43. The RAM C51 stores pachet data according to a write address given from the controller C43 and then outputs therefrom the stored data according to a read address. The output packet data are then output through a terminal C52.

The controller C43 designates the same address as the random readout address designated for the RAM C46 as the write address of the RAM C51 and designates a sequential read address as the read address of the RAM C51. Thus, the program signal is read out from the RAM C51 by a unit of packet-basis from the RAM C51 in the sequential order.

An ROM C48 stores the random address generating sequence by the controller C43. The controller C43 stores an address generating pattern in the RAM C49 and generates random address in the RAM C46, C51 using the data read out from the ROM C48.

Now, the operation of the embodiment configured as mentioned above will be described.

The operations ranging from the receipt of broadcast signals, the tuning/demodulation and up to the error correction are the same as those in the embodiment, as, as shown in FIG. 2. The error corrected program signal is input to the encryptor C41 via the terminal C45. The program signal is sequentially written in the RAM C46 by a unit of packet-basis according to the address designated by the controller C43.

The controller C43 generates read addresses of the RAM C46 based on the data read from the ROM C48. This read address is used for reading out the program signal by a unit of packet-basis. The program signal read out by a unit of packet-basis from the RAM C46 is supplied to the IC card C2 via a terminal C47.

The IC card C2 decodes ciphers made by the encryption at the transmitter side. As the encryption at the transmitter side is made by a unit of packet-basis, the decoding against the encryption at the transmitter side is possible even if the encryption was made in the packet shuffling fashion by the encryptor C41.

The program signal decrypted in the IC cards is supplied to the decryptor C42.

The RAM C51 of the encryptor C42 writes the program signal under the control of the controller C43. In this case, the controller C43 designates the same address as the read address for the RAM C46 as a write address for the RAM C51. Thus, the program signal is written in the original packet sequence.

The controller C43 generates reading addresses to read out data by a unit of packet-basis sequentially from the RAM C51. Thus, the program signal is read out from the RAM C51 in the original packet sequence.

As described above, in this embodiment, the packet shuffling is carried out as the encryption in the receiver main unit. The encrption by the packet shuffling has a reversible relation with the encryption by a unit of packet-basis at the transmitter side. Thus in the status further encrypted in the receiver side, only the encryption applied in the transmitter side can be reset in the IC card. Therefore, it is possible to not only communicate the encode signals on the IC card interface between the receiver main unit and the IC card, but also prevent unauthorized copying, etc.

Further, when an amount of packets to be replaced is made large, the security level can be increased. On the other hand, however, it becomes necessary to increase the amount of delay by the RAM and a size of circuit will become large. So, if a plurality of address patterns are stored in the ROM and a different address pattern is used for every packet shuffling, it becomes possible to make the security level relatively high even if an amount of packets to be replaced is relatively small. The actually used address pattern is stored in the RAM C49.

Further, the security level can be further improved by shaffling the sequence of a plurality of address patterns with a function of a terminal ID and an internal timer value.

Figure 5:
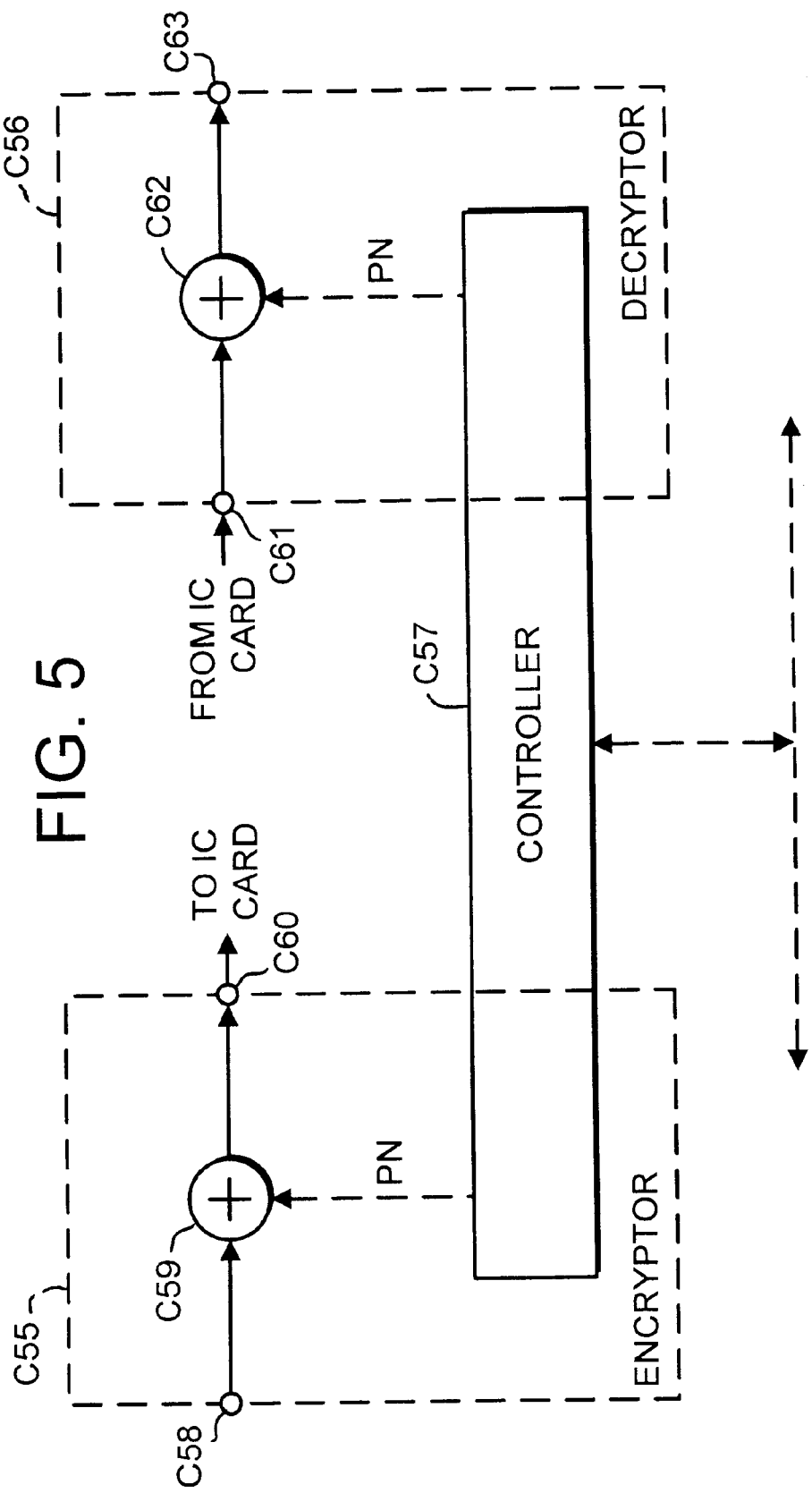
FIG. 5 is a block diagram showing a third embodiment of the digital broadcast receiver according to the first aspect of the present invention.

FIG. 5 is a block diagram showing a third embodiment of the digital broadcast receiver according to the first aspect of the present invention. This embodiment shows definite examples of the encryptor and the decryptor of the receiver main unit. In FIG. 5, a combination of an encryptor C55 and a controller C57, and a combination of a decryptor C56 and the controller C57 correspond to the combination of the encryptor C21 and the decryptor C22, as shown in FIG. 2, respectively. Other elements of the receiver main unit are the same as those, as shown in FIG. 2, and the illustration thereof will be omitted. The broken lines in FIG. 5 shows buses.

There are various kinds of IC cards; not only IC cards for decoding block ciphers, etc. but also IC cards used only for extracting a given program signal from input signals but not carring out any signal processing. Further, there is a case that unencrypted signal is transmitted from fron the broadcast station, such as a free program broadcasting. In these cases, it is not necessary to define the encryption at a receiver side at a reversible process against the process at a transmitter side. This embodiment shows examples in this case.

The program signal processed in the error corrector C6 is supplied to the encryptor C55 through a terminal C58. The encryptor C55 comprises an adder C59 and the controller C57. The controller C57 supplies a random number (PN) which varies in a unit of bit-basis to the adder C59. The adder C59 encrypts the input program signal by adding random numbers thereto. The encrypted program signal is supplied to the IC card via a terminal C60.

The output of the IC card is supplied to a terminal C61 of the decryptor C56. The decryptor C56 comprises an adder C62 and the controller C57. The controller C57 generates the same random numbers as the random numbers supplied to the adder C59 of the encryptor C55 and generates them to the adder C62. The adder C62 restores the original program signal by adding the random numbers to the input encrypted TV programsignal.

Now, the operation of the embodiment configured as mentioned above will be described.

In this embodiment, for instance, a broadcast signal which is not encrypted at the transmitter side is received. This broadcast signal is tuned, demodulated and error corrected and then, supplied to the encryptor C55 as in the embodiment, as shown in FIG. 2. In this embodiment, random numbers are supplied to the adder C59 of the encryptor C55 from the controller C57. The adder C59 encrypts the program signal by adding random numbers on the program signal.

The program signal from the encryptor C55 is supplied to an IC card through the terminal C60 via the IC card interface. The program signal processed in a predetermined fashion in the IC card is supplied to the decryptor C56 in the receiver main unit through the IC card interface.

The same random numbers as those supplied to the adder C59 from the controller C57 are given to the adder C62 of the decryptor C56 and the adder C62 obtains the original program signal by adding the random numbers to the input program signal. The decrypted program signal is output via the terminal C63.

Thus, in this embodiment, as the encrypted data only appears at the IC card interface portion between an IC card and the receiver main unit, the unauthorized use of data by taking the data from the IC card interface portion can be prevented.

Further, when the initial value of random numbers is updated using terminal ID and internal timer values, etc. as a function, it becomes possible to further improve the security level.

Figure 6:
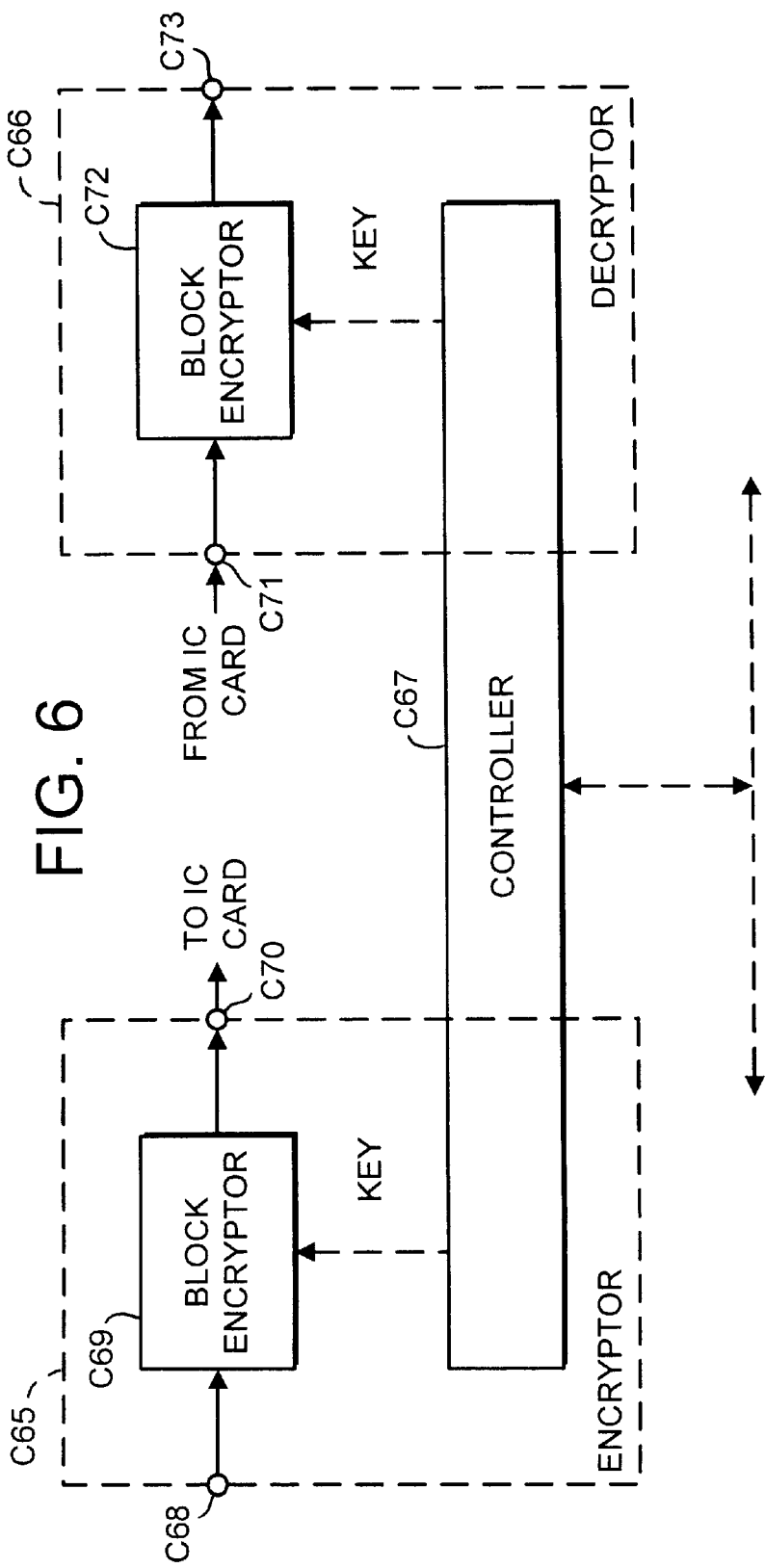
FIG. 6 is a block diagram showing a fourth embodiment of the digital broadcast receiver according to the first aspect of the present invention.

FIG. 6 is a block diagram showing a fourth embodiment of the digital broadcast receiver according to the first aspect of the present invention. This embodiment shows definite examples of the encryptor and the decryptor of the receiver main unit. In FIG. 6, the combination of a block encryptor C69 and a controller C67 and the combination of a block-decryptor C72 and the controller C67 correspond to the combination of the encryptor C21 and the decryptor C22, as shown in FIG. 2, respectively. Other elements are the same as those, as shown in FIG. 2, and the illustration thereof will be omitted. In FIG. 6, the broken lines indicate buses.

This embodiment shows a case wherein it is not needed to define the encryption at the receiver side at a reversible process against the process at the transmitter side likewise the embodiment, as shown in FIG. 5.

To the encryptor C65, the program signal from the error corrector C6 is supplied via a terminal C68. The encryptor C65 comprises the block encryptor C69 and the controller C67. The controller C67 supplies prescribed encryption-key information to the block encryptor C69. The block encryptor C69 carries out a block encryption, such as "DES" or "MULTI-2", to the input program signal using the encryption-key information. The program signaln encrypted by the block encryption is supplied to an IC card via a terminal C70.

The output of the IC card is supplied to a terminal C71 of a decryptor C66. The decryptor C66 comprises the block decoder C72 and the controller C67. The controller C67 generates an encryption-key information the same as the encryption-key information supplied to the block encryptor C69 of the encryptor C65 and supplies to a block decoder C72. The block decoder C72 restores the input program signal to the original program signal by block-decrypting by using the encryption-key information. The decrypted program signal is then output through a terminal C73.

Now, the operation of the embodiment configured as mentioned above will be described.

In this embodiment, for instance, broadcast signals not encrypted at the transmitter side are received at the receiver side likewise the embodiment, as shown in FIG. 5. This broadcast signal is tuned, demodulated, error corrected and supplied to the encryptor C65 as in the embodiment, as shown in FIG. 2. In this embodiment, key information is supplied from the controller C67 to the block encryptor C69 of the encryptor C65 and the block encryptor C69 encrypts the program signal using the key information.

The program signal from the encryptor C65 are supplied to IC card from the terminal C70 through the IC card interface. The program signal processed in the predetermined fashion in the IC card is supplied to the decryptor C66 in the receiver main unit through the IC card interface.

The same key information as the key information supplied to the block encryptor is given to the block decoder C72 of the decryptor C66 from the controller C66 and the block decoder C72 decodes the input program signal using the key information. Thus, the original program signal is obtained. The decrypted program signal is output via a terminal C73.

Thus, in this embodiment, even if broadcast signals which are not encrypted at the transmitter side are processed by IC card, an unauthorized use of program signals can be prevented by communicating the signal specifically encrypted in the receiver main unit between the IC card and the receiver main unit.

Figure 7:
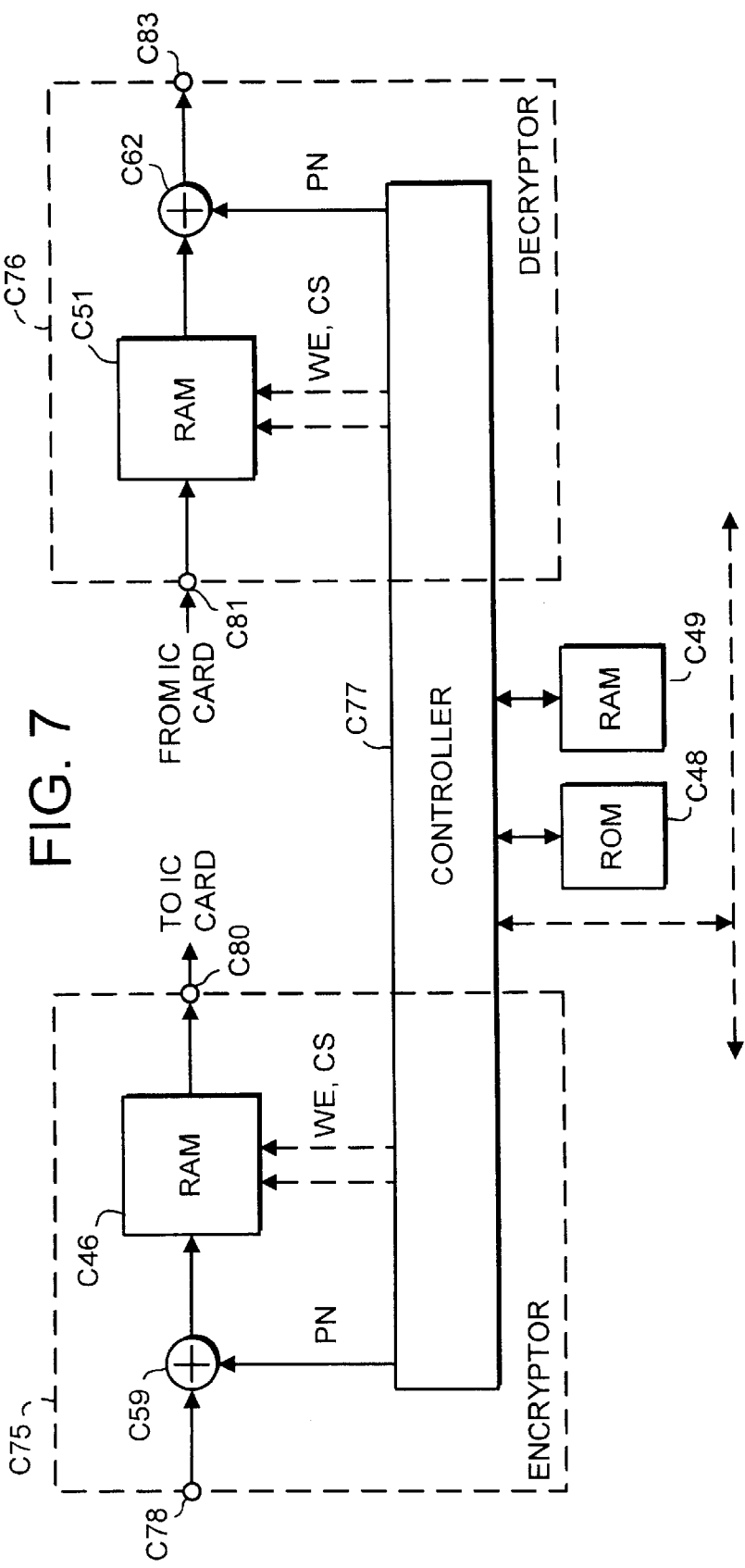
FIG. 7 is a block diagram showing a fifth embodiment of the digital broadcast receiver according to the first aspect of the present invention.

FIG. 7 is a block diagram showing a fifth embodiment of the digital broadcast receiver according to the first aspect of the present invention. In FIG. 7, the same component elements as those, as shown in FIGS. 4 and 5, are assigned with the same reference numerals and the explanation thereof will be omitted in the following description.

For the transport stream specified in ISO/IEC13818-1, a 4-bit cyclic counter has been specified to packets having the same identifier (PID) so that a lack of packet can be known. As a matter of course, this cyclic portion is not encrypted. Therefore, even if the encryption according to the packet shuffling was carried out as in the embodiment, as shown in FIG. 4, it may be possible to analyze original sequence of packets by using the cyclic counter. This embodiment makes this analysis impossible.

This embodiment differs from the embodiments, as shown in FIGS. 4 and 5, in that an encryptor C75 and a decryptor C76 are adopted. The encryptor C75 comprises an adder C59, a RAM C46 and a controller C77 while the decryptor C76 comprises a RAM C51, an adder C62 and the controller C77.

The RAMs C46, C51 are arranged like those, as shown in FIG. 4. The adders C59, C62 are also arranged like those, as shown in FIG. 5. The controller C77 gives the same random numbers to the adders C59, C62. In this embodiment, the controller C77 feeds random numbers to the adders C59, C62 at timings timed by a cyclic counter.

The controller C77 gives the write address of the RAM C46 as the read address of the RAM C51 and the read address of the RAM C46 as the write address of the RAM C51. The controller C77 provides random read addresses for the RAM C46 and also random write addresses for the RAM C51, respectively on packet-basis.

In the embodiment configured as mentioned above, the program signal from the error corrector C6 are supplied to the adder C59 via a terminal C78. The controller C77 gives random numbers to the adder C59 at the timing of the cyclic counter and the counter C59 adds the random numbers to the cyclic counter only. Bit data added with random numbers and bit data without random numbers added are given to the RAM C46 and are written sequentially, for instance, by a unit of packet-basis.

The controller C77 reads out data stored in the RAM C46 at random by a unit of packet-basis. Thus, the broadcast program signal that are supplied from a terminal C89 becomes in the status applied with the encryption peculiar to the receiver main unit.

The program signal from IC cards are supplied to the encryptor C76 via the IC card interface. The program signal obtained through a terminal C81 are given to the RAM C51 and written by the controller C77 in the same packet sequence as the RAM C46. The program signal stored in the RAM C51 are read out sequentially by a unit of packet-basis and returned to the original packet sequence.

The program signal read out of the RAM C51 are given to the adder C62 and random numbers are added at the timing corresponding to the cyclic counter. Thus, the cyclic counter is decoded.

As the cyclic counter portion are coded in this embodiment as described above, the analysis of the original packet sequence in the datan encrypted by the packet shuffling by the cyclic counter can be prevented.

Figure 8:
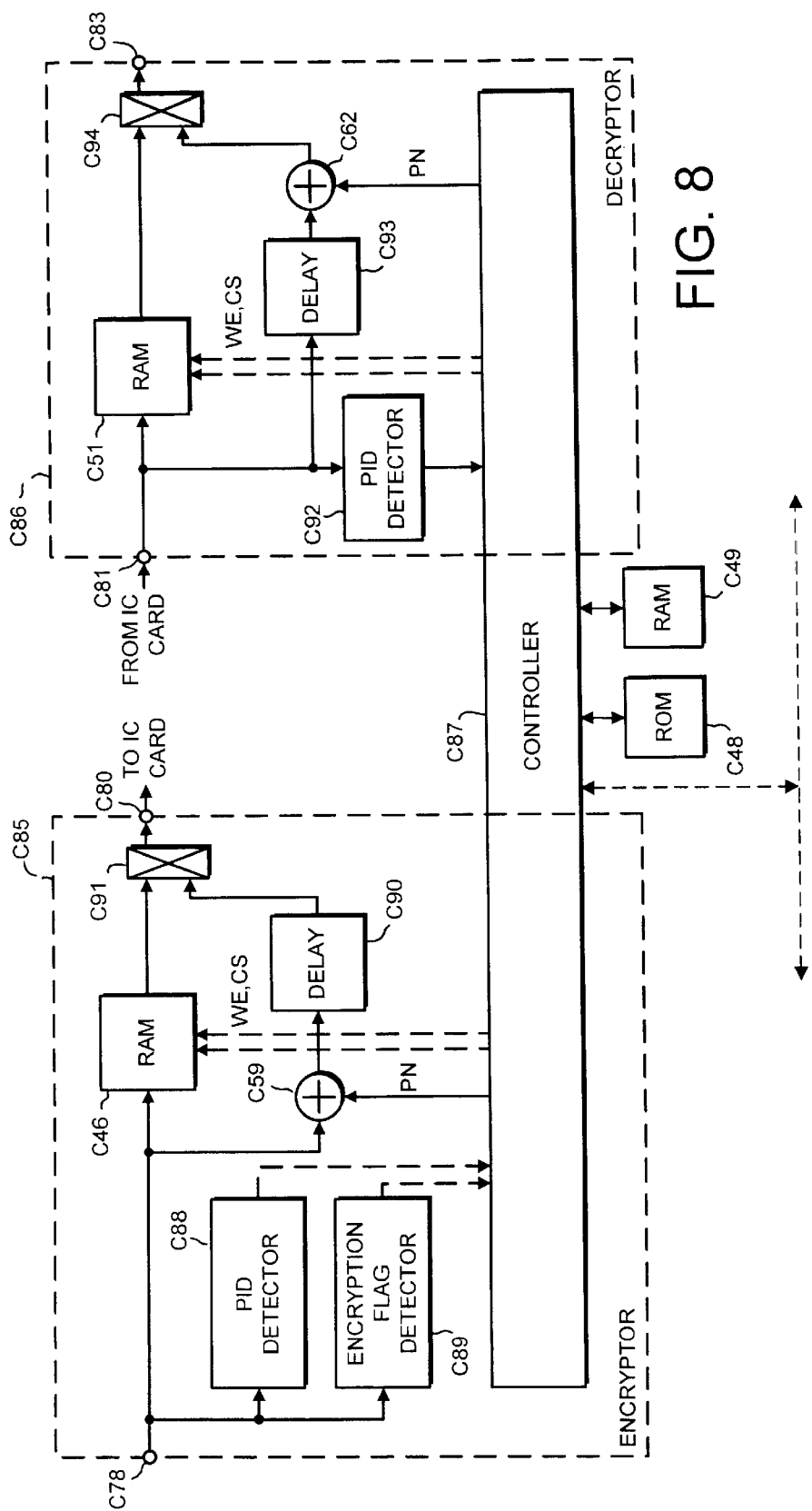
FIG. 8 is a block diagram showing a sixth embodiment of the digital broadcast receiver according to the first aspect of the present invention.

FIG. 8 is a block diagram showing a sixth embodiment of the digital broadcast receiver according to the first aspect of the present invention. In FIG. 8, the same component elements as those, as shown in FIG. 7, are assigned with the same reference numerals and the explanation thereof will be omitted in the following description.

When the encryption applied on the broadcast station side is decrypted by IC cards connected to the receiver main unit through the IC card interface, an encryptor having the reversibility to the process at the transmitter side is needed at the receiver side. On the contrary, when signals that are not encrypted such as free broadcast, etc. are received, the decryption is not carried out by IC cards and therefore, an encryptor provided in the receiver main unit is not needed to have the reversibility.

With the point taken into consideration, in this embodiment, the encryption format is varied in accordance with whether a multiplexed packet is encrypted or not.

The program signal input through the terminal C78 are supplied to a PID detector C88, an encryption flag detector C89, the RAM C46 and the adder C59. The PID detector C88 detects PID included in the input program signal and then supplies the detected PID to a controller C87. Further, the encryption flag detector C89 detects an encryption flag included in the input program signal and then supplies the detected flag to the controller C87.

The controller C87 gives the same random numbers to the adders C59, C62 and gives the same write and read addresses as those in the embodiment, as shown in FIG. 7, to the RAMs C46, C51. Further, the controller C87 generates a selection control signal based on the detection results of the PID detector C88 and the encryption flag detector C89 outputs it to a selector C91. In other words, when the program signal is encrypted, the controller C87 outputs a selection control signal to have the selector C91 select the output of the RAM C46 and when the program signal is not encrypted, select the output of a delay circuit C90.

The program signal applied with the encryption by the RAM C46 are given to the selector C91. The program signal applied with the encryption by the adder C59 are given to the selector C91 through the delay circuit C90. The delay circuit C90 sets the time of the outputs of the RAM C46 and the adder C59.

The program signal from an IC card are input to a decryptor C86 via the terminal C81. This program signal is supplied to a PID detector C92, the RAM C51 and a delay circuit C93. The PID detector C92 detects PID in the input program signal and then supplies the detected PID to the controller C87.

The controller C87 generates a selection control signal based on the detected result of the PID detector and then supplies the selection control signal to a selector C94. That is, when the program signal were encrypted, the controller C98 outputs a selection control signal to force the selector C94 to select the output of the RAM C51 and when the program signal were not encrypted, select the output of the adder C62.

The delay circuit C93 outputs the program signal by delaying to the adder C62. The selector C94 outputs either one of the output of the RAM C51 or the output of the adder C62 to the terminal C83 according to the selection control signal.

Now, the operation of the embodiment configured as mentioned above will be described.

Now, assuming that program signal that is encrypted at a transmitter side are input through the terminal C78. The program signal is supplied to the RAM C46 and the adder C59 and applied with the encryption. The controller C87 detects that the program signal is applied with the encryption according to the outputs of the PID detector C88 and the encryption flag detector C89.

In this case, the controller C87 outputs a selection control signal for selecting the RAM C46 to the selector C91. The selector C91 outputs the program signal that are encrypted by the RAM C46 through the terminal C80. This program signal is supplied to an IC card through the IC card interface.

The encryption of the RAM C46 is a reversible process against the encryption at a transmitter side. Accordingly, the decryption is possible to the encryption applied in a transmitter side in IC cards.

The program signal from IC cards are supplied to the descramber C86 via the terminal C81. The program signal is given to the RAM C51 and also, to the adder C62 via the delay circuit C93 and decrypted, respectively. The PID detector C92 detects PID of the input program signal and then supplies the detected PID to the controller C87.

When recognizing that the program signal input to the decryptor C86 are applied with the encryption by the packet shuffling based on the PID detection result, the controller C87 outputs a selection control signal to the selector C94 select the output of he RAM C51. As a result, the program signal decrypted by the RAM C51 are output through the terminal C83.

On the contrary, when program signal that are not encrypted at a transmitter side are input through the terminal C78, the selector C91 selects the output of the delay circuit C90. In this case, random numbers are added to the program signal by the adder C59 and the encrypted program signal is output through the-terminal C80.

Further, the program signal from the IC card are input to the decryptor C86 through the terminal C81 and after delayed by the delay circuit C93, supplies to the adder C62. The adder C62 performs the decryption by adding the random numbers given from the controller C87. In this case, the controller C87 forces the selector C94 to select the output of the adder C62 and the program signal decrypted by the adder C62 are output through the terminal C83.

Thus, in this embodiment, the encryption in the receiver main unit can be activated or deactivated in accordance with whether the broadcast signal is encrypted or not.

Figure 9:
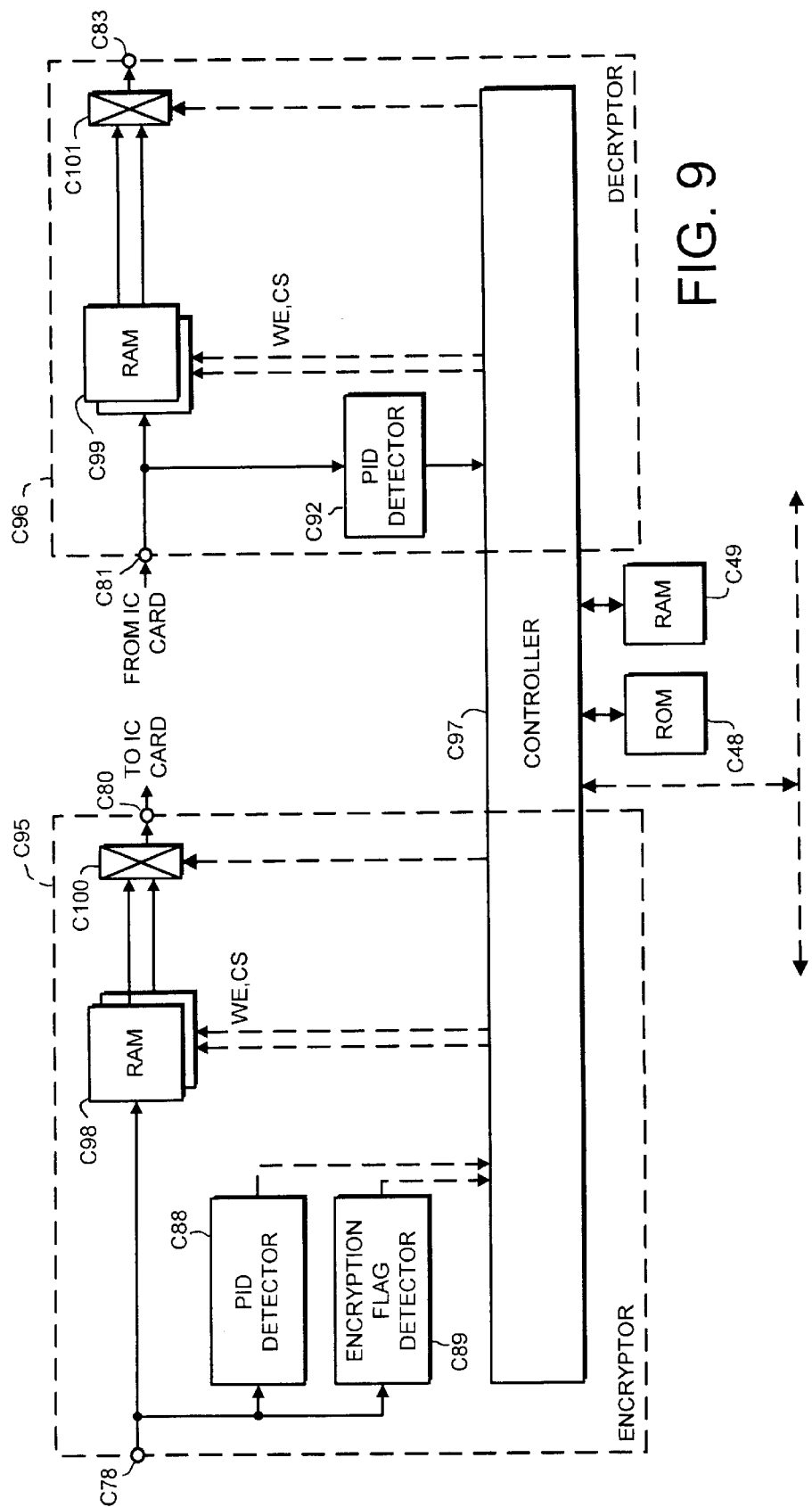
FIG. 9 is a block diagram showing a seventh embodiment of the digital broadcast receiver according to the first aspect of the present invention.

FIG. 9 is a block diagram showing a seventh embodiment of the digital broadcast receiver according to the first aspect of the present invention. Further, FIGS. 10(a) to 10(c) are diagrams for explaining the operation of the embodiment of the digital broadcast receiver, as shown in FIG. 9. In FIG. 9, the same component elements as those, as shown in FIG. 8, are assigned with the same reference numerals and the explanation thereof will be omitted in the folowing description. Packets A and B in FIG. 10(a) represent PIDs. FIG. 10(a) shows packets FIG. 10(b) shows the period to use the same encryption key by the PID for the packets A. And FIG. 10(c) shows the period to use the same encryption key by the PID for the packets-B.

In the transport stream, a plurality of program signals are made in packets and multiplexed and therefore, the program signal is identified by said PID packets. For the encryption to be applied to subscription TV programs, etc., two kinds of keys (ODD/EVEN), as shown in FIGS. 10(a) to 10(c), and by using these keys alternately while updating them, security is improved. In this case, keys not in use are updated successively so that no discontinuous period is produced. Further, when a plurality of program signals are subscription TV channels and the encryption is applied, the encryption periods of these program signals may not be in accord with each other in many cases.

Now assuming that the packet shuffling is made in the period 1, as shown in FIGS. 10(a) to 10(C). Then, depending on the position where Packet B(*) of PID B, the decryption is made using an already updated key and the program signal is not properly decrypted.

This embodiment is to prevent the generation of such a problem by checking the PID and the encryption flag.

In this embodiment, the encryptor C95 and the decryptor C96 have RAMs C98, C99, respectively. The RAMs C98, C99 have a plurality of areas, respectively so as to write data in different areas for every PID. A controller C97 designates a different area address of the RAM C98 for every PID based on the detection results of the PID detector C88 and the encryption flag detector C89, and also supplies a selection control signal for selecting the grogram signal to a selector C100. The selector C100 reads out the grogram signal from the memory area designated by the selection control signal and then supplies the program signal to the terminal C80.

Further, the controller C78 designates a different area address of the RAM C99 for every PID based on the detection result of the PID detector C92 and then supplies a selection control signal for reading the program signal to a selector C101. The selector C101 reads out the program signal from the area designated by the selection control signal and then supplies the program signal to the terminal C83.

The designation of write and read addresses by the controller C97 is the same as in the embodiment, as shown in FIG. 8. Further, the controller C97 obtains PID information of transport packets including a program signal selected by a viewer by making the communication with the controller C17 via the IC card controller C23, as shown in FIG. 2.

Figure 11A:
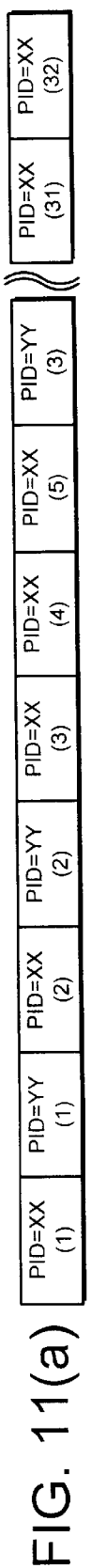
FIGS. 11(a) to 11(d) are diagrams for explaining the operation of the embodiment of the digital broadcast receiver, as shown in FIG. 9.
Figure 11B:
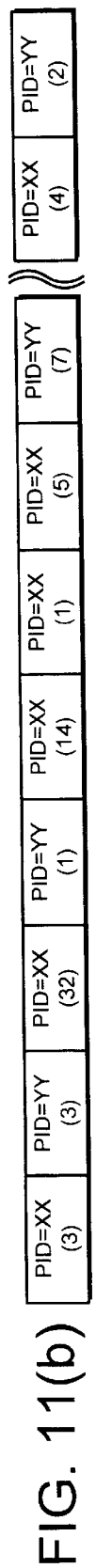
Figure 11C:
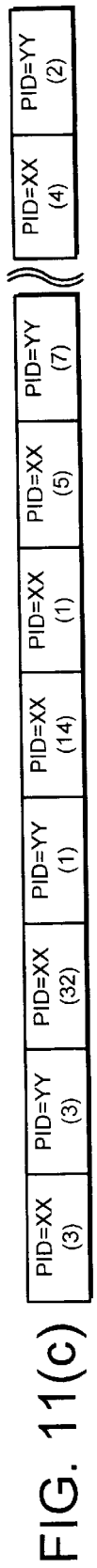

Now, the operation of the embodiment configured as mentioned above will be described in reference to the explanatory diagram, as shown in FIGS. 11(a) to 11(d). FIGS. 11(a) to 11(d) are diagrams for explaining the operation of the embodiment of the digital broadcast receiver, as shown in FIG. 9. FIG. 11(a) shows data to be input through the terminal C78, FIG. 11(b) shows data to be output through the terminal C80, FIG. 11(c) shows data to be input through the terminal C81, and FIG. 11(d) shoes data to be output through the terminal C83.

To the terminal C78, for instance, the data, as shown in FIG. 11(a), are input. This data are supplied to the PID detector C88, the encryption flag detector C89 and the RAM C98. The controller C97 decides an area of the RAM C98, into which input data are written by comparing the detected results of the PID detector C88 with the packet PID information including a program signal selected by a viewer.

The PID, as shown in FIG. 11(a), writes XX data into a specified area on the RAM98 by a unit of packet-basis and YY data into another specified area on the RAM C98 by a unit of packet-basis. Further, the controller C97 stores the rows of the original packets in the RAM C49.

The controller C97 generates an address pattern of the RAM C98 for every PID based on the output of the ROM C48 and replace packets for every PID. The controller C97 stores the set address patterns in the RAM C49.

Thus, the data applied with the packet shuffling for every same PID are output. The selector C100 reads out the RAM C98 under the control of the controller C97 and the outputs the encrypted data through the terminal C80, as shown in FIG. 11(b).

In this embodiment, if the program signal has changed between the encrypted status and the unencrypted status during the packet-shaffling, the controller C97 suspends the shaffling of the packets indicated by the PID and while it controls to read the memory according to the address the same as the address used at a writing of data to the memory.

The data output to the terminal C80 are supplied to an IC card and after applied with a specified process, inputs to the terminal C81 of the decryptor C96 (FIG. 11(c)). The data input through the terminal C81 are supplied to the RAM C99. The controller C97 decides an area of the RAM C99, into which the input data are stored in what packet sequence and generates a write address of the RAM C99.

Figure 11D:
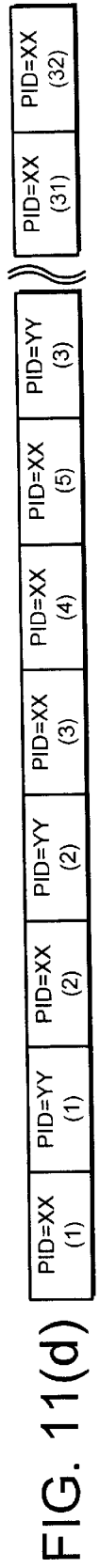

Thus, the packets which are rearranged for every PID and returned to a sequential order are stored in the RAM C99. Data read out of the RAM C99 are rearranged to the original packet sequence by the selector C10, as shown in FIG. 11(d).

Thus, in this embodiment, the packet shuffling was suspended based on the detected result of the encryption flag and it is possible to prevent that the decryption becomes impossible by updated keys.

Preferred embodiments of the digital broadcast receiver according to the present invention will be explained hereinafter in reference to the drawings.

Figure 12:
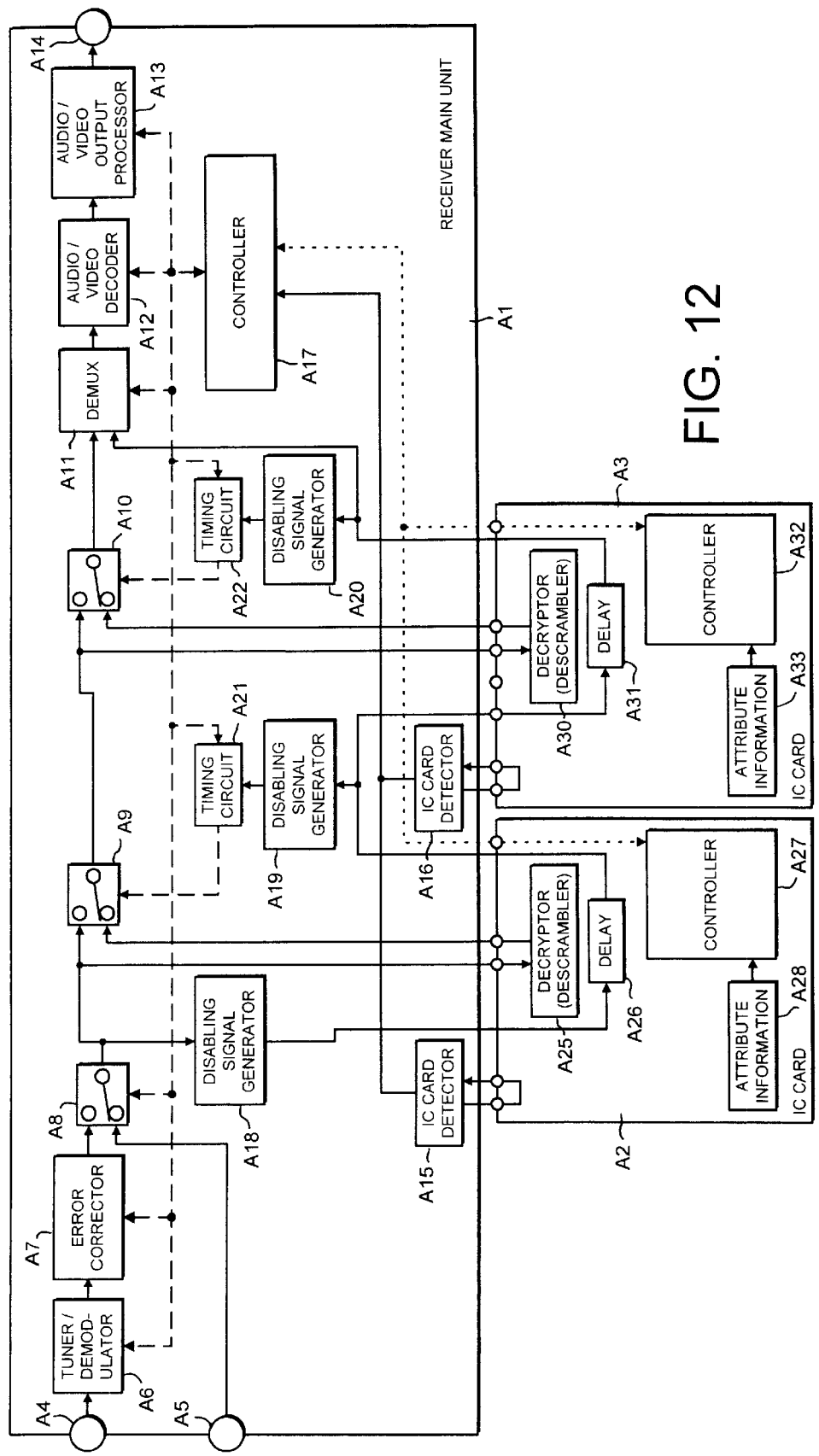
FIG. 12 is a block diagram showing a first embodiment of the digital broadcast receiver according to the second aspect of the present invention.

FIG. 12 is a block diagram showing a first embodiment of the digital broadcast receiver according to the second aspect of the present invention.

First, the digital broadcast receiver of the first embodiment according to the present invention is comprised of the receiver main unit A1 and the first and the second IC cards A2 and A3 connected to the receiver main unit A1, as shown in FIG. 12. In the digital broadcast receiver, it is possible to connect several IC card in order to correspond to several subscription TV system, and the input and output signals between several IC cards A2 and A3 are connected in the so called daisy-chain fashion. Each IC card A2 and A communicates with the controller A17 in the receiver main unit A1 via each controller A27 and A32 to control each decryptor A25 and A30.

Here, in FIG. 12, it is shown a decryption as the function of the IC cards A2 and A3. However, it may connect at least two IC cards in the daisy-chain fashion, and further, the application of the IC card may be the teletext receiving function or the external output interface.

The receiver main unit A1 is provided with a first input terminal A4 to which the digital broadcast signal that is encrypted by the predetermined encryption, frequency multiplexed and time division multiplexed is supplied, and a second input terminal A5, which is connected to the external signal generator such as the digital video tape recorder, to which the reproduced signal supplied from the external signal generator is supplied. The reproduced signal may be supplied to either the IC cord A2 or A3. Further, the digital broadcast signal supplied via the first input terminal A4 and the reproduced signal supplied from the external signal generator supplied via the second input terminal A5 are hereinafter referred to as the broadcast signal.

The broadcast signal supplied via the first input terminal A6 is supplied to a tuner/demodulator A6, and the broadcast signal supplied via the second input terminal A5 is supplied to a first selector A8.

Figure 13A:
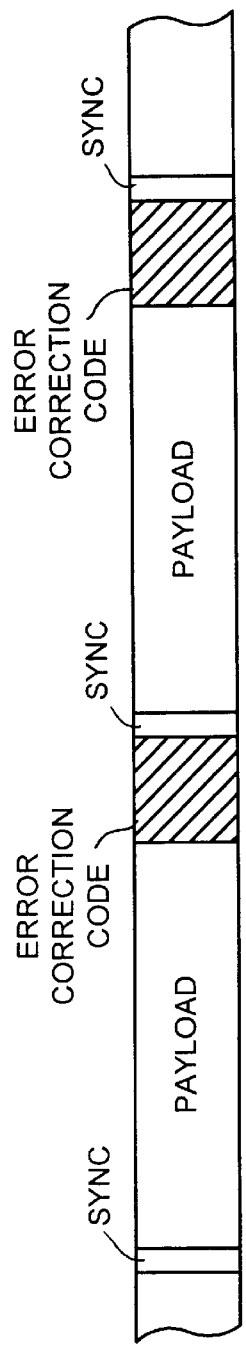
FIGS. 13(a) to 13(c) are timing charts for explaining the operation of the first embodiment of the digital broadcast receiver according to the second aspect of the present invention.
Figure 13B:
Figure 13C:

The tuner/demodulator A6 selects the signal having the frequency which corresponds to the program signal selected by viewers, and demodulates the received signal so as to supply it to the error corrector A7. Generally in the digital broadcast, the program signal is transmitted by added with the error correcting code. Concretely, the broadcast signal is comprised of a series of a packet which is comprised of the synchronizing signals, the payloads, and the error correcting codes, as shown in FIG. 13(a). FIGS. 13(a) to 13(c) are timing charts for explaining the operation of the first embodiment of the digital broadcast receiver according to the second aspect of the present invention The error corrector A7 corrects the errors made on the transmission of the broadcast signal. Generally, the signal stream of the output signal supplied from the error corrector A7 has a format matching with the MPEG-SYSTEM (ISO/IEC13818-1) standard, and the signal of some program signals is time division multiplexed. Further, by the error correcting processing, the portion of the error correcting code of the broadcast signal after the error correcting shown by the slash in FIG. 13(a) will be disabled. The broadcast signal is supplied to the first selector A8.

The controller A17 controls a first selector A8 so as to select the broadcast signal selected by viewers from the broadcast signals which are supplied to the first selector A8 via the first and the second input terminals A4 and A5. The broadcast signal selected by the first selector A8 is supplied to a signal processor A25 (decryptor) inside the first IC card A2, a second selector A9 and a disabling signal generator A18.

The decryptor A25 of the first IC card A2 decodes the broadcast signal by decrypting to the signal stream of the broadcast signal. The decryption is carried out only on the necessary portion of the stream signal.

That is, the decryptor A25 decrypts only the program signal selected by viewers among the stream signals to which the several program signals are multiplexed. And it supplies the other program signals to the demultiplexer (referred to as DEMUX) A11 via the second selector A9 and the third selector A10 inside the receiver main unit A1 without decryption. The decryption A30 inside the second IC card A3 decrypts the broadcast signal as same as the decryptor A25 inside the first IC card and supplies the signal to the DEMUX A11 via the third selector A10 in side the receiver main unit A1.

The DEMUX A11 to which the decrypted signal is supplied, disables the ineffective portion (the portion to which the error correcting code is added) of each packet based on the "disabling signal", that is explained below.

Concretely, the disabling signal generator A18, to which the broadcast signal carried out the error correcting processing output from the first selector A8 is supplied, detects the ineffective portion (the portion to which the error correcting code is added) of the broadcast signal to be supplied and generates the disabling signal which will be the high level between the ineffective portions, as shown in FIG. 13(b), so as to supply the signal to the delay circuit A26 of the IC card A2.

The delay time of the delay circuit A26 is set to equal to the time required for the decryption in the decryptor A25. The delay circuit A26 delays the time necessary for decrypting the disabling signal, and supplies it to the first disabling signal generator A19 and the delay circuit A31 of the second IC card A3 inside the receiver main unit A1.

The delay circuit A31 of the second IC card A3 delays the time that the decryptor A30 requires for decrypting the supplied disabling signal, and supplies it to the second disabling signal generator A20 and the DEMUX A11 inside the receiver main unit A1.

As mentioned above, since the broadcast signal supplied to the DEMUX A11 is decrypted in the decryptors A2b and A30 inside each IC cards A2 and A3, the signal is carried out the delay for these two times of decryptions so as to be supplied to the DEMUX A11. Further, the disabling signal generated in the disabling signal generator A18 is delayed the time for the two times of decryptions in the delay circuits A26 and A31 inside each IC cards A2 and A3 so as to supplied to the DEMUX A11 Accordingly, the timing of supplying the ineffective portion of each packet to the DEMUX A11 is exactly as same as the timing of supplying the disabling signal.

The DEMUX A11 selects the required signal among the broadcast signals which is time division multiplexed and supplies it to the audio/video decoder A12, at the same time, it performs the ineffective processing to ineffectiveate the broadcast signal which is supplied between the disabling signal is supplied. Accordingly, even in the case that the ineffective portion is contained in the broadcast signal it is possible to performs the signal processing exactly as the ineffective so that it prevents the inconvenience to make a malfunction or loss of synchronizing on the following stage by the ineffective portion.

The audio/video decoder A12 to which the broadcast signal supplied from the DEMUX A11 is supplied decodes the audio/video signal which is digital-compression-coded so as to supply it to the audio/video output processor A13. The audio/video output processor A13 performs the D/A conversion, and the system conversion, and supplies the broadcast signal to the television receiver to the output terminal A14. Accordingly, viewers can view his/her favorite program signal.

Here, in case of that the second and third selectors A9 and A10 which are selecting the broadcast signals supplied from the first selector A8 are controlled to select the broadcast signals which are supplied from the decryptors A25 and A30 of each IC cards A2 and A3, if the changing is carried out on the synchronizing signal or the payload, as shown in FIG. 13(a), it causes the inconvenience to make a malfunction or loss of synchronizing on the following stage such as the DEMUX A11.

The digital broadcast receiver of the first embodiment is provided with the first and the second disabling signal detectors A19 and A20 for detecting the disabling signals supplied from the delay circuits A26 and A31 of each IC cards A2 and A3, and the timing circuit A22 for controlling the second and the third selectors A9 and A10 based on the detection output from the disabling signal detectors A19 and A20.

When the second and third selectors A9 and A10 selects the broadcast signal supplied from the first selector A8, the first disabling signal detector A19 detects the disabling signal as shown in FIG. 13(b), which is generated regularly in the disabling signal generator A18 and supplied via the delay circuit A26 of first IC card A2. The first disabling signal detector A19 detects the disabling signal supplied from the delay circuit A26, and supplies the detected output to the timing circuit A21. Similarly, the second disabling signal detector A20 detects the disabling signal supplied via the delay circuit A31 of the second IC card A3. The second disabling signal generator A20 detects the disabling signal supplied from the delay circuit A31 and supplies the detected output to the timing circuit A22.

The controller A17 supplies the selection control signal to each timing circuits A21 and A22 when the second and the third selectors A9 and A10 selects the broadcast signal supplied from the decryptor A25 and A30 of each IC cards A2 and A3. Each timing circuits A21 and A22, when the selection control signal is supplied, will stand by till the detected output of the disabling signal supplied from the disabling signal detector A19 and A20 is supplied, then it controls the second and the third selectors A9 and A10 in order to select the broadcast signal which is supplied from the decryptor A25 and A30 of each IC cards A2 and A3 by the selection control signal, as shown in FIG. 13(c), at the timing that the detected output of the disabling signal is supplied. Here, in FIG. 13(c) the low level control signal controls the second and the third selectors A9, A10 to select broadcast signals supplied through the first selector A8, while the high level control signal controls the second and the third selectors A9, A10 to select broadcast signals supplied through the decryptors A25, A30.

Accordingly, since the second and the third selectors A9 and A10 are operated at the timing that the disabling signal is supplied, it is possible to prevent the inconvenience to make the malfunction or the loss of synchronization in the following stage such as the DEMUX A11.

Now, among IC cards there are an IC card like a decryptor, an IC card for processing input signals, and an IC card like a teletext decoder which does carry out signal processing. Accordingly, in each IC cards A2 and A3 of the digital broadcast apparatus of the first embodiment, the attribute information memories A28 and A33 where the attribute information showing the attribution of the IC card such as that the IC card only reads the signal or rewrites are defined. Each controllers A27 and A32 of each IC cards A2 and A3 communicate between the controllers 1 of the receiver main unit A1 so as to transmit the attribute information of each IC cards A2 and A3 to the receiver main unit A1.

Since the controller A17 in the receiver main unit A1 does not need to supply the broadcast signal to each IC cards A2 and A3 by controlling the second the third selectors A9 and A10, in the case that the IC card shows the attribute much to read the signal, it controls the second and the third selectors A9 and A10, so that the broadcast signal bypasses the IC cards A2 and A3. Accordingly, it does not need to control the selectors, so that the digital broadcast receiver certainly.

Now, a second embodiment of the digital broadcast receiver according to the second aspect of the present invention will be explained in reference to FIGS. 14 to 16. The broadcast apparatus of the first embodiment of the digital broadcast receiver according to the second aspect of the present invention as mentioned above detects the disabling signal which is to be contained in each packet of the broadcast signal after the error correction, then based on the detection, it controls the second and the third selectors A9 and A10. However, the disabling signal is not always contained in the broadcast signal. The digital broadcast receiver of the second embodiment controls the second and third selectors A9 and A10 based on the disabling signal or the reset signal which are generated in the receiver main unit A1.

Here, the second embodiment of the digital broadcast receiver according to the second aspect of the present invention has only one difference in the point mentioned above from one of the above-mentioned first embodiment. The difference will be explained below, and same components, as shown in FIG. 12, are assigned with the same symbols in FIG. 14 and these explanations will be omitted in the following description.

Figure 14:
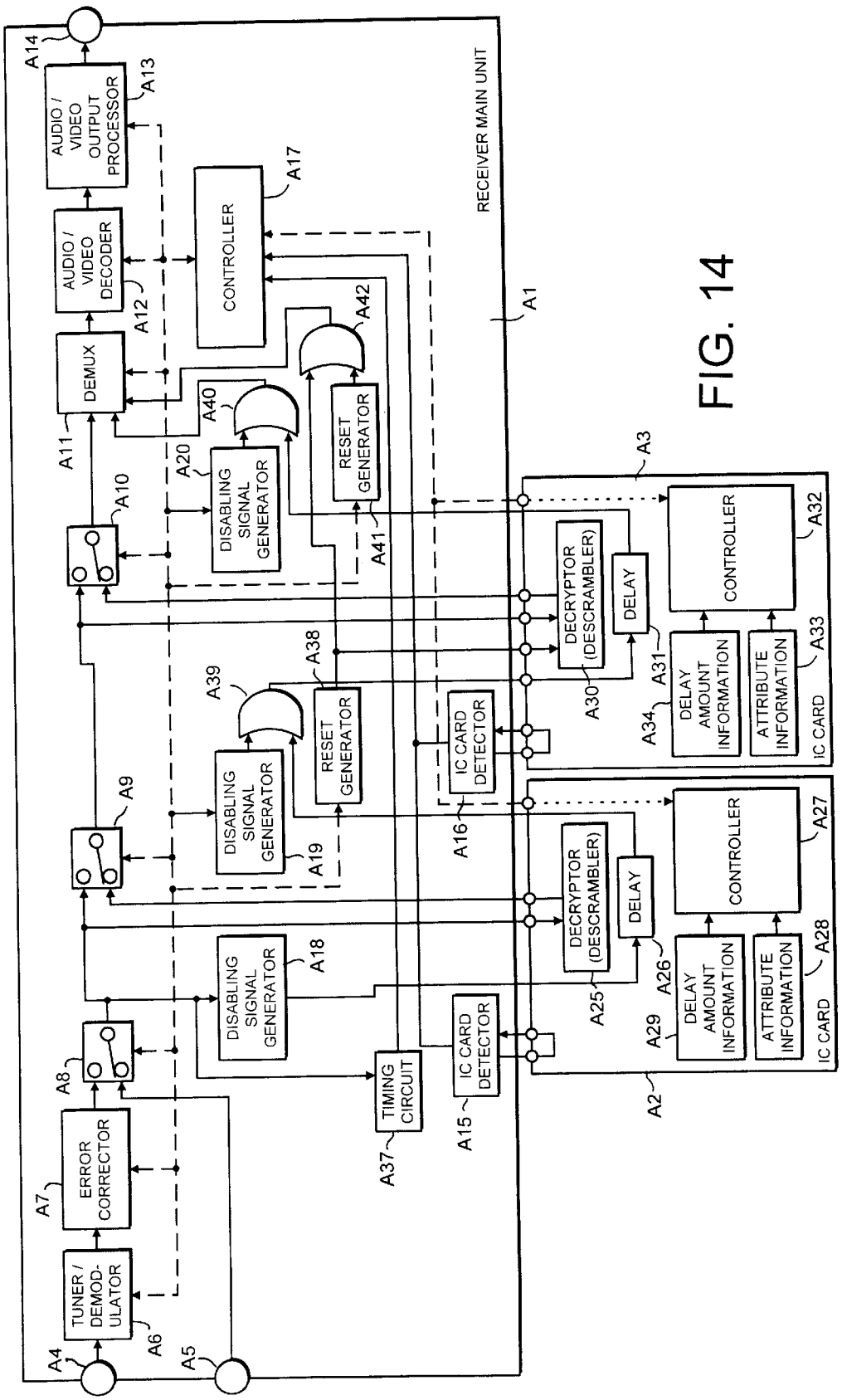
FIG. 14 is a block diagram showing a second embodiment of the digital broadcast receiver according to the second aspect of the present invention.

That is, the digital broadcast receiver of the second embodiment is provided with the first and the second disabling signal generators A19 and A20 for generating the disabling signal to ineffective the prescribed broadcast signal (prescribed packet) at the operation time of the selectors A9 and A10, as shown in FIG. 14, a first OR circuit A39 for taking logical OR of the disabling signal generated in the first disabling signal generator A19 and the disabling signal which is carried out the delay processing for the decryption in the delay circuit A26, and a second OR circuit A40 for taking logical OR of the disabling signal generated in the second disabling signal generator A20 and the disabling signal which is carried out the delay processing for the decryption and for supplying the logical OR to the DEMUX A11.

Further, the digital broadcast receiver of the second embodiment is provided with a first reset generator A38 for generating the reset signal for given time, and outputting it in case that it selects the broadcast signal supplied from the decryptor A25 by the second selector A9 or (and) it selects the broadcast signal supplied from the first selector A8 by the second selector A9, a second reset generator A41 for generating the reset signal for given time, and outputting it in case that it selects the broadcast signal supplied from the decryptor A30 by the third selector A30 or (and) it selects the broadcast signal supplied from the second selector A9 by the third selector A10, and a third OR circuit A42 for taking logical OR of the reset signals supplied from the reset generators A38 and A41 and for supplying the logical OR to the DEMUX A11.

In the digital broadcast receiver of the second embodiment mentioned above, the receiver main unit A1 performs the signal processing based on the data transmission clock, as shown in FIG. 15(a). FIGS. 15(a) to 15(g) are timing charts for explaining the operation of the second embodiment of the digital broadcast receiver according to the second aspect of the present invention, at instances of operations of the second and the third selectors.

Here, although presently the second and third selectors A9, A10 are controlled to pass the broadcast signal comprised of a sequence of packets Dn, Dn+1, Dn+2 . . . , as shown in FIG. 15(b), directly through the selectors A8 and A9, when the second and third selectors A9, A10 are controlled to select the signal supplied from the encryptor A25 in response to the high level selector control signal, as shown in FIG. 15(e), at the instant that the packet Dn+2, as shown in FIG. 15(b), has been supplied to the second selector A9, to the second selector A9 via the selector A8, if the second and the third selectors A9 and A10 are controlled to select the broadcast signal supplied from the decryptor A25 in response to the high level signal, as shown in FIG. 15(e), at the timing that the packet Dn+2, as shown in FIG. 15(b), i.e., the timing of the head of the packet Dn+1, the DEMUX A11 is supplied with duplicate packets of the received broadcast signals. data transmit clock, the broadcast signal supplied from the decryptor A25 is supplied to the second selector A9 at the timing delayed for two data transmit clock, as shown in FIG. 15(c). Accordingly, when the selectors are controlled at the timing mentioned above, the packet Dn and the packet Dn+1 which are delayed for two data transmit clock, as shown in FIG. 15(d), are transmitted following to the packet Dn and the packet Dn+1 which are transmitted earlier via the second selector A9 without being supplied to the decryptor A25, so that the each duplicated packets Dn and Dn+1 are duplicated and supplied to the DEMUX A11, which cause the malfunctions.

Accordingly, the first and the second disabling signal generators A19 and A20 generate the disabling signal for the time necessary for the decryption, as shown in FIG. 15(f), for the two data transmit clock, at the timing that the second selector A9 is controlled to select the broadcast signal supplied from the decryptors A25 and A30. The disabling signal supplied from the first disabling signal generator A19 is supplied to the delay circuit A31 of the second IC card A3 via the first OR circuit A39, delayed for the two data transmit clock, and supplied to the DEMUX A11 via the second OR circuit A40. Further, the disabling signal supplied from the second disabling signal generator A20 is supplied to the DEMUX A11 via the second OR circuit A40.

The broadcast signal which is decrypted in the decryptor A25 of the first IC card A2 is supplied to the decryptor A30 of the second IC card A3 via the second selector A9, then it is decrypted by taking the time for the two data transmit clock, so as to be supplied to the DEMUX A11 via the third selector A10.

Accordingly, in the DEMUX A11, since the disabling signal is possible to disable the broadcast signal at the timing that the duplicated packets (in this case, the packet Dn and the packet Dn+1) generated in the operation timer of the second and the third selectors A9 and A10 are supplied to the DEMUX A11, it is possible to prevent the malfunction in the next-step circuit such as the DEMUX A11.

Now, for instance when the second and the third selectors A9 and A 10 are controlled to select the broadcast signal supplied from the first selector A8, as shown in FIG. 15(e), at the timing of the head of the packet Dm, as shown in FIG. 15(c), the decryptor A30 of the second IC card A3 requires a time period for the two data transmit clocks, so that the signal supplied from the third selector A10 lacks the packet Dm+1 and the Dm+2 which should have been supplied to the third selector A10 before two data transmer clocks for the selector control, as shown in FIG. 15(d), and it causes the malfunction in the next circuit such as the DEMUX A11.

Accordingly, when the digital broadcast receiver detects the changing control of the second and the third selectors A9 and A10, the reset generators A38 and A41 generate the reset signal for the two data transmit clock, as shown in FIG. 15(g), at that timing of the detection (in this case, the timing of the head of the packet Dm), then they supply the signal to the DEMUX A11 via the OR circuit A42. So that, at the timing of the changing control it is possible to reset the DEMUX A11, and it starts the new signal processing at that point to the DEMUX A11, so that it prevents the inconvenient to cause the malfunction in the next circuit.

Now, when the second and the third selectors A9 and A10 are controlled to select the broadcast signal supplied from each IC cards A2 and A3 only the disabling signal is generated. However, the generators A38 and A41 may generate the reset signal and reset the DEMUX A11 at the changing timing, as shown by the dotted line in FIG. 15(g).

Now, when the first IC card A2 or the second IC card A3 which is put on the receiver main unit A1 is taken off, the first IC card detector A15 or the second IC card detector A16 detects it. However, it takes some time and it causes the uncertain signal for this detecting time in the broadcast signal supplied from the second selector A9. Accordingly, the digital broadcast receiver of the second embodiment, when either the IC card A2 or the IC card A3 is taken off the receiver main unit A1, resets the DEMUX A11 by the reset signal generated in the reset generator A38 or A41, so as to prevent the malfunction which is caused when the uncertain signal is carried out the signal processing.

Now, FIGS. 16(a) to 16(g) are timing charts for explaining the operation of the second embodiment of the digital broadcast receiver according to the second aspect of the present invention, at instances of loading/unloading of the IC cards. Concretely, FIG. 16(a) shows the data transmit clock, and FIG. 16(b) shows the broadcast signal supplied from the first selector A8 supplied to the second selector A9. For instance, in case that the first IC card A2 is taken off during the time when the packet Dn of the broadcast signal is supplied to the decryptor A25 of the first IC card A2, the following broadcast signal supplied from the decryptor A25 which is supplied to the selector A9 will be non-signal, as shown in FIG. 16(d), and the broadcast signal supplied from the second selector A9 will be uncertain signal as shown by the slant line in FIG. 15(d).

It takes some time for the first IC card detector A15 to detect that the first IC card A2 is taken off. So, until the determined result is obtained from an unloading of the first IC card A2 from the IC card interface, the first IC card detector A15 supplies a low level detection signal, as shown in FIG. 16(g), indicating that the first IC card A2 is loaded in the IC card interface to the controller A17, and then at the timing it supplies a high level detection signal indicating that the first IC card A2 has been unloaded from the IC card interface to the controller A17.

The controller A17, when to which the high level detection signal supplied from the first IC card detecter A15 is supplied, controls the second selector A9, which has been controlling in order to select the broadcast signal supplied from the decryptor A25 of the first IC card A2, as shown in FIG. 16(e), to select the broadcast signal supplied from the first selector A8. Accordingly, from the timing of the detection of taking off the first IC card A2, as shown in FIG. 16(d), it supplies the broadcast signal supplied from the fist selector C8 to the following stage.

Further, the control signal A17, when the high level detection signal supplied from the first IC card detecter A15 is supplied to the controller A17, controls the reset generator A38 in order to generate the reset signal, as shown in FIG. 16(f), at the same time to control the second selector A9. Accordingly, the reset signal supplied from the reset generator A38 is transferred to the DEMUX A11 via the third OR circuit A42, so that the DEMUX A11 is reset. So, it is possible to control the DEMUX A11 to re-operate the signal processing newly in the DEMUX A11 from that reset point, and prevent the malfunctions caused of the signal processing of the uncertain signal.

Now, the signal processing time of the decryptors A25 and A30 defined in each IC cards A2 and A3 is not limited to the same fixed signal processing time (the delay amount of the broadcast signal output via the signal processing is not always same). If the pulse length (or pulse width) of the disabling signal is fixed, it means that the packet to be disabled in the DEMUX A11 is not accurately disabled.

Accordingly, in each IC cards A2 and A3 of the digital broadcast receiver in the second embodiment each delay amount information memories A29 and A34 are defined, wherein the delay amount information showing the time that each decryptor A25 and A30 require to perform the signal processing is stored.

The controller A17 of the receiver main unit A1, when each IC cards A2 and A3 are put on, takes communication between each controller A27 and A32 of each IC cards A2 and A3, and takes in the delay amount information read out from each delay amount information memories A29 and A34 in each controllers A27 and A32. Then, the controller A17 controls the pulse width of the disabling signal generated from each disabling signal generators A19 and A20, based on the delay amount information which is taken in.

So, according to the signal processing time of the decryptors A25 and A30 defined in each IC cards A2 and A3, it is possible to accurately disable the packet to be disabled in the DEMUX A11.

Since the broadcast signal received to the receiver main unit A1 is packeted, the second and third selectors A9, A10 are desirable to be controlled at the boundary between adjacent packets.

Accordingly, in the receiver main unit of the digital broadcast receiver in the second embodiment, a timing circuit A37 is defined for detecting the pause of each packets of the broadcast signal via the first selector A8. The timing circuit A37 detects the synchronizing signal which is added to the header of each packet as explained in FIG. 13(a), and at that timing it supplies the synchronizing detection signal to the controller A17. The controller A17, when controlling the second and the third selectors A9 and A10, controls them at the timing that the synchronizing detection signal is supplied. So that, it is possible to control the broadcast signal for more certain signal processing.

Figure 17:
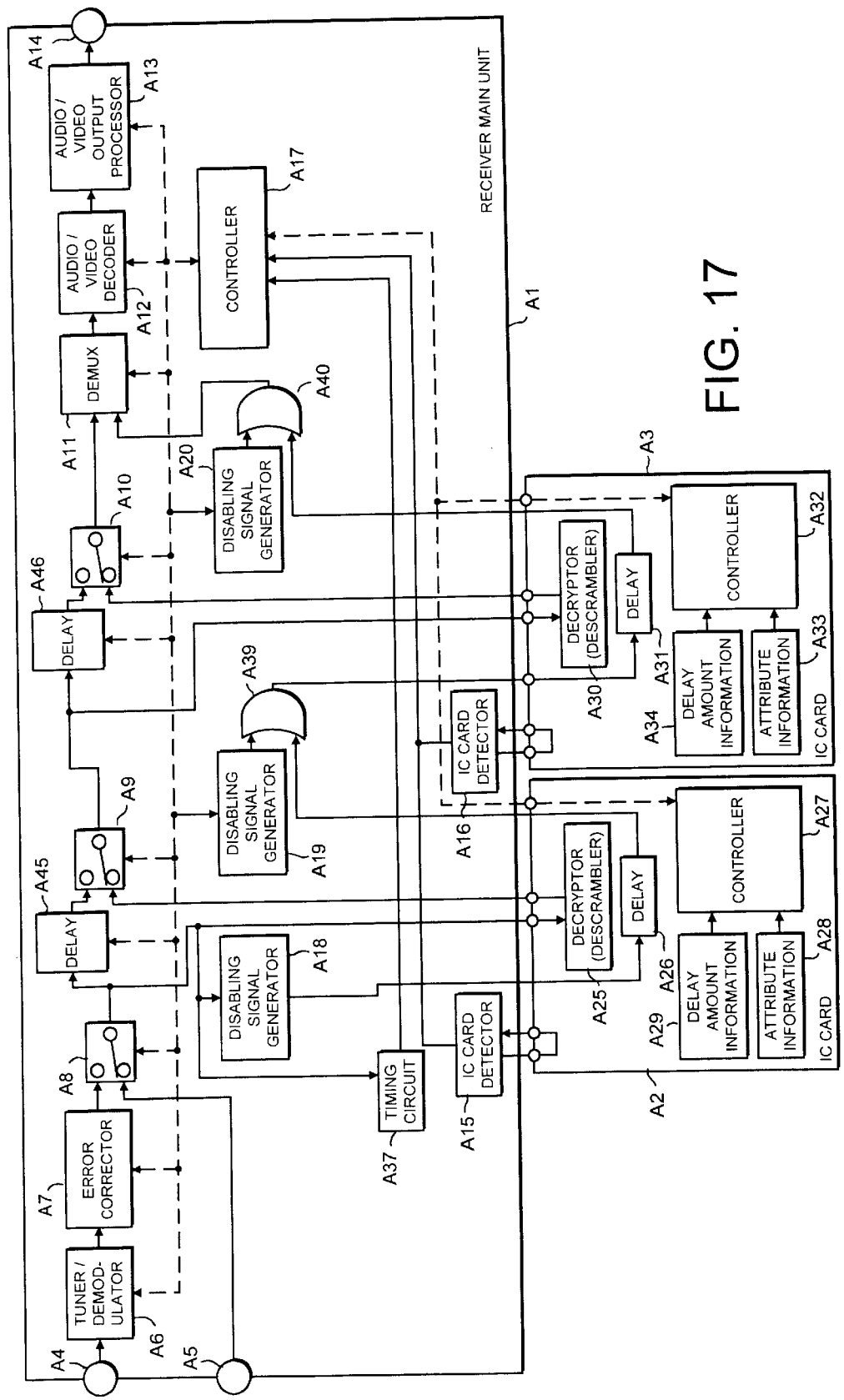
FIG. 17 is a block diagram showing a third embodiment of the digital broadcast receiver according to the second aspect of the present invention.

Now, a third embodiment of the digital broadcast receiver according to the second aspect of the present invention will be explained, in reference to FIGS. 17 and 18. FIG. 17 is a block diagram showing a third embodiment of the digital broadcast receiver according to the second aspect of the present invention. The digital broadcast receiver in the third embodiment delays the received signal supplied through the first selector A8 by the time period necessary for decrypting in each of IC cards A2 and A3, so as to prevent the out of phase caused by the phase gap which the following stage such as the DEMUX A11 make in the broadcast signal when the second and the third selectors A9 and A10 are controlled.

Here, the third embodiment of the digital broadcast receiver according to the second aspect of the present invention has differences from the above-mentioned first and the second embodiments, only in these points. Hereinafter, the element relating the differences will be explained, and the same elements having the same operation are assigned with the same symbols and/or numerals in FIG. 17, and these explanations will be omitted in the folowing description.

That is, the digital broadcast receiver in the third embodiment has a first delay circuit A45 provided between the first and second selectors A8, A9, and a second delay circuit A46 provided between the second and third selectors A9, A10, as shown in FIG. 17. The former one, i.e., the first delay circuit A45 delays the received signal to the second selector A9 in bypassing the first IC card A2 by a time period that the received signal passes through the first IC card A2. While the latter one, i.e., the second delay circuit A46 delays the received signal to the third selector A10 in bypassing the second IC card A3 by a time period that the received signal passes through the second IC card A3.

The digital broadcast receiver in the third embodiment performs the signal processing based on the data transmit clock, as shown in FIG. 18(*a*). As explained in the second embodiment, if the second and the third selectors A9 and A10 are controlled to select the broadcast signals supplied from each decryptors A25 and A30 of each IC cards A2 and A3, as shown in FIG. 18(*c*), by the selector control signal which will be high level from low level, as shown in FIG. 18(*e*), the DEMUX A11 is controlled to be reset by the high level reset pulse, as shown in FIG. 18(*f*), at the timing that the duplicated packets (in this case, the packets Dn and Dn+a) which are generated at the operation time is supplied to the DEMUX A11.

Now, when the second and third selectors A9, A10 select the signal, as shown in FIG. 18(*b*), directly supplied from the first selector A8 (undecrypted signal), the controller A17 controls the first and second delay circuits A45, A46 to delay the signals directly supplied from the first and second selectors A8, A9 by the time periods corresponding to those necessary for the decryptions in the first and second IC cards A2, A3.

Figure 18A:
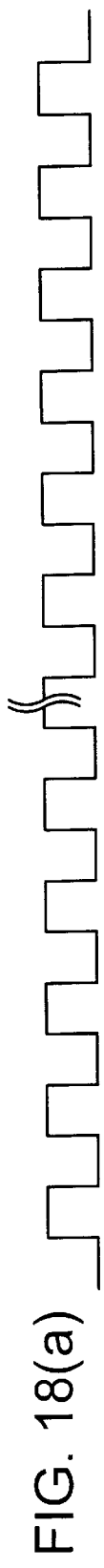
FIGS. 18(a) to 18(f) are timing charts for explaining the phase matching operation of the broadcast signal that is carried out the signal processing in the IC card and the broadcast signal which is not carried out the signal processing, in the third embodiment of the digital broadcast receiver according to the second aspect of the present invention.
Figure 18B:
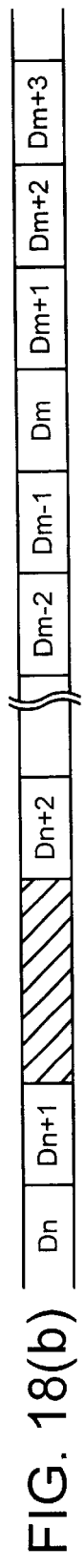
Figure 18C:
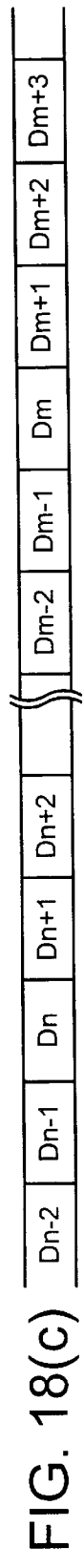
Figure 18D:
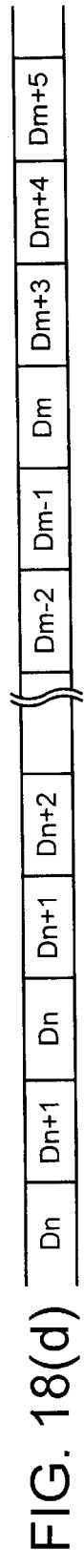
Figure 18E:
Figure 18F:

Accordingly, as shown in FIGS. 18*c* and 18*d*, it is possible to mach the phases of the broadcast signal which is decrypted and the broadcast signals which are supplied to via the second selector A9 via the first selector A8. So, in the case that the second and the third selectors A9 and A10 are controlled to select the broadcast signal supplied from the first selector A8 the broadcast signal is supplied to the following stage such as the DEMUX A11 in the status that the phases are matched, so that it prevents an out of phase caused by that the broadcast signals which has gapped phases are supplied, and further get the same effect as the digital broadcast receiver in the first and the second embodiments.

Here, there may be cases where the time periods necessary for the decryption vary from IC card to IC card. In the digital broadcast receiver in the third embodiment each signal processing times are stored in the delay amount information memories A29 and A34 of each IC cards A2 and A3. And, the controller A17 of the receiver main unit A1 takes communication between each controllers A27 and A32 of each IC cards A2 and A3 and controls the delay time of each delay circuits A45 and A46 according to the signal processing times stored in each delay amount information memories A29 and A34. Accordingly, it is possible to control the delay time of the broadcast signal supplied from the first selector A8 or the second selector A9 according to the signal processing time of each IC cards A2 and A3, so as to prevent the inconvenience such as the out of phase in the following stage such as the DEMUX A11.

Now, the digital broadcast receiver in the fourth embodiment according to the present invention will be explained.

Figure 19:
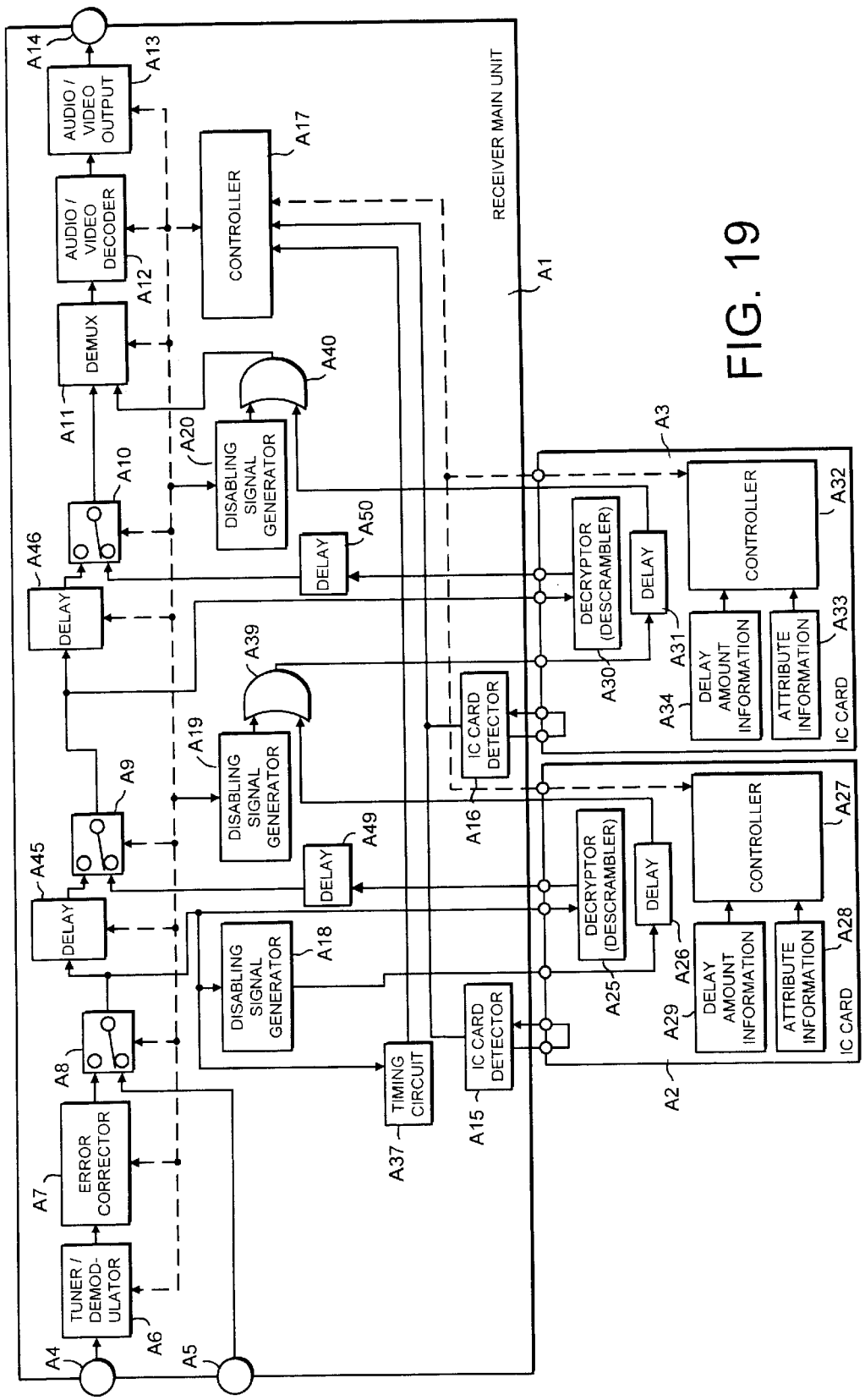
FIGS. 19 is a block diagram showing a fourth embodiment of the digital broadcast receiver according to the second aspect of the present invention.

The digital broadcast receiver in the fourth embodiment, as same as one in the third embodiment, as shown in FIG. 19, is provided with the first and the second delay circuits A45 and A46 for performing the predetermined delay processing to the broadcast signals via the first and the second selectors A8 and A9, and third and fourth delay circuits A49 and A50 for performing the delays which are equal to the detecting time that each IC card detecters A15 and A16 detect the unloading of each of the IC cards A2 and A3 to the broadcast signals supplied from each decryptors A25 and A30, and supplying them to the second and the third selectors A9 and A10.

Here, the digital broadcast receiver according to the fourth embodiment has differences from one in the third embodiment only in these points that the third and the fourth delay circuits A49 and A50 are defined. Hereinafter, the elements relating the differences will be explained, and the same elements having the same operation are assigned with the same symbols and/or numerals in FIG. 19, and these explanations will be omitted in the following description.

The FIGS. 10(*a*) through 10(*f*) show the data transmit clock which is the standard of the signal processing, the broadcast signal supplied from the first selector A8, the broadcast signal which is decrypted from the first IC card A2, the broadcast signal output via the second selector A9, the selector control signal to change and control the second and the third selectors A2 and A3 (select the broadcast signal which is decrypted at high level), and the detection signal supplied from the first IC card detecter A15 (showing that the IC card is put on at the low level, and it is taken off at the high level).

Here, in that embodiment, it is assumed that the time period necessary for the desryptions in the first and second IC cards A2, A3 correspond to the two data transmit clocks, and that the times that the respective IC card detecters A15 and A16 require to detect the IC cards corresponds to the four data transmit clocks.

In FIG. 19 and FIGS. 20(*a*) to 20(*f*), if the first IC card A2 is unloaded from the receiver main unit A1 at the timing of the head of the packet Dn+1, as shown in FIG. 20(*b*), since the broadcast signal for 4 data transmit is stored in the third delay circuit A49, the broadcast signal is output as it is via the second selector A9. The first IC card detecter, since it takes 4 data transmit clock time for it's detection, detects the unloadings of the IC card A2 after four data transmit clocks from the unloading of the first IC card A2, as shown in FIG. 20(f), so as to supply the detected output to the controller A17.

Figure 20A:
FIGS. 20(a) to 20(f) are timing charts for explaining the operation of the fourth embodiment of the digital broadcast receiver according to the second aspect of the present invention, at the instance of unloading the IC card.
Figure 20B:
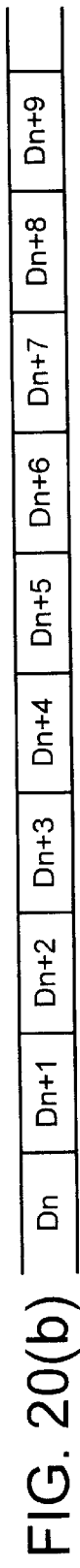
Figure 20C:
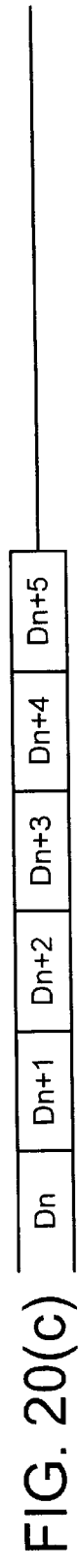
Figure 20D:
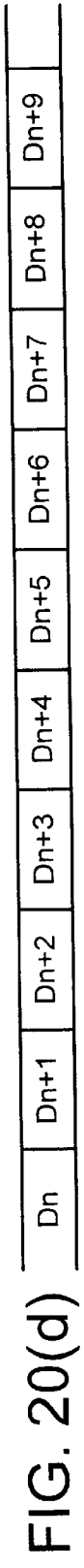
Figure 20E:

The controller A17, when the detected output is supplied to, supplies the low level selector control signal to the second and the third selector A9 and A10, as shown in FIG. 20(e), and changes and controls the selectors A9 and A10 in order to select the broadcast signal which is supplied directly from the first description.

The FIGS. 10(a) through 10(f) show the data transmit clock which is the standard of the signal processing, the broadcast signal supplied from the first selector A8, the broadcast signal which is decrypted from the first IC card A2, the broadcast signal output via the second selector A9, the selector control signal to change and control the second and the third selectors A2 and A3 (select the broadcast signal which is decrypted at high level), and the detection signal supplied from the first IC card detecter A15 (showing that the IC card is put on at the low level, and it is taken off at the high level).

Here, in this embodiment, it is assumed that the time period necessary for the desryptions in the first and second IC cards A2, A3 correspond to the two data transmit clocks, and that the times that the respective IC card detecters A15 and A16 require to detect the IC cards corresponds to the four data transmit clocks.

Figure 20F:

In FIG. 19 and FIGS. 20(a) to 20(f), if the first IC card A2 is unloaded from the receiver main unit A1 at the timing of the head of the packet Dn+1, as shown in FIG. 20(b), since the broadcast signal for 4 data transmit is stored in the third delay circuit A49, the broadcast signal is output as it is via the second selector A9. The first IC card detecter, since it takes 4 data transmit clock time for it's detection, detects the unloadings of the IC card A2 after four data transmit clocks from the unloading of the first IC card A2, as shown in FIG. 20(f), so as to supply the detected output to the controller A17.

The controller A17, when the detected output is supplied to, supplies the low level selector control signal to the second and the third selector A9 and A10, as shown in FIG. 20(e), and changes and controls the selectors A9 and A10 in order to select the broadcast signal which is supplied directly from the first selector A8 or the second selector A9, without passing through the IC card A2 or A3. Accordingly, the broadcast signal supplied to the DEMUX A11 is able to be changed to the broadcast signal delayed two data transmit clock which has a matched phase with the decrypted signal supplied from the first IC card A2, as shown in FIG. 20(d). So that it is possible to supply the supplied from the second and the third selectors A9 and A10 to the following stages such as the DEMUX A11 without making error data, prevent the inconveniences such as the malfunction of the following stage caused by the error data, and get the same effect as one in each embodiments mentioned above.

Figure 21:
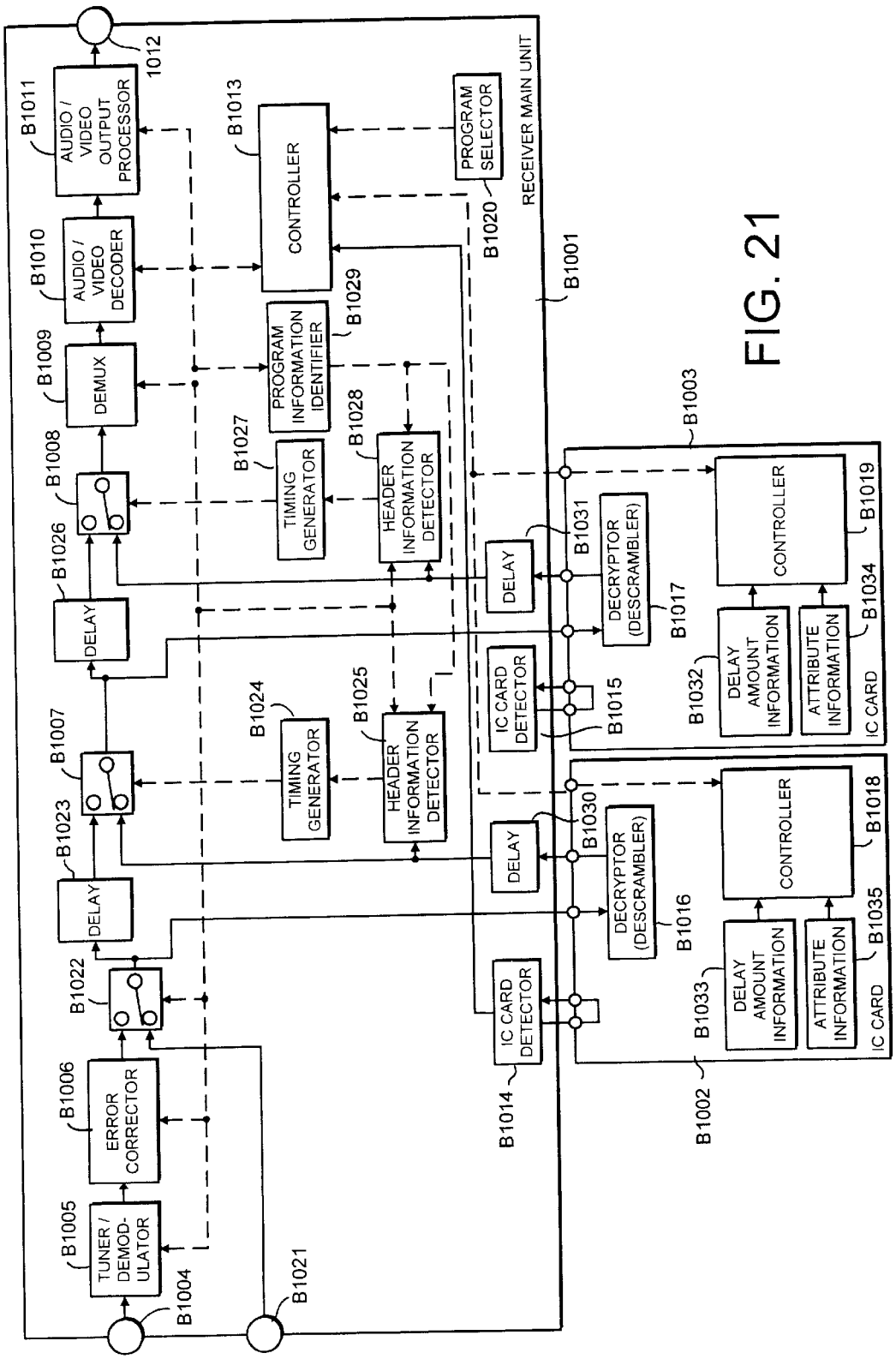
FIG. 21 is a block diagram showing a first embodiment of the digital broadcast receiver according to the third aspect of the present invention.

Embodiments of the present invention will be explained hereinafter in references to FIGS. 21 to 30. FIG. 21 is a block diagram showing the first embodiment of the digital broadcast receiver according to the present invention.

Here, the same components as those explained in the conventional embodiments are assigned with the same symbols.

In FIG. 21, the digital broadcast receiver is comprised of the digital broadcast receiver main unit (hereinafter referred to as the receiver main unit) that is the first apparatus, the second apparatus which is removable to the receiver main unit B1001, and the IC cards B1002 and B1003.

In the receiver main unit B1001, to the conventional receiver main unit B9901, as shown in FIG. 1, are added the input terminal B1021, the selector B1022, the delay circuits B1023, B1026, B1030 and B1031, the timing generators B1024 and B1027, the header information detectors B1025 and B1028, the program information identifier B1029, and the program selector B1020.

Among these components, some of the most important components for the present invention are the delay circuits B1023 and B1026 having the fixed delay time and the delay circuits B1030 and B1031 having the variable delay time.

The delay circuits B1023 and the B1026 having the fixed delay time are the delay circuit where the maximum delay time permitted in the IC card as the broadcast system or more delay time are fixed. The delay circuits B1030 and B1031 having the variable delay time can set the delay time which is variable according to the delay characteristics of the corresponding IC cards B1002 and B1003.

In each IC cards B1002 and B1003, the delay amount information memories B1033 and B1032, and the attribute information memories B1035 and B1034 are added to each conventional IC cards A102 and A103, shown in FIG. 1.

The delay information memories B1033 land B1032 memorize the information about the broadcast signal delay time or the delay amount in inside of each IC cards B1002 and B1003 Attribute information memories B1035 and B1034 store therein attributes of processing contents for broadcast signals provided in the IC cards B1002 and B1003.

The delay information memories B1033 land B1032 memorize the information about the broadcast signal delay time or the delay amount in inside of each IC cards B1002 and B1003

The broadcast signal selected in the selector B1022 is divided into two, one is delayed in the delay circuit B1023 and input to one input of the selector B1007. The other is output to the signal processor B1016 in the IC card B1002, where it is decrypted, then it is input to the delay circuit B1030 in the receiver main-unit again, where it is delayed, so as to be input to the other input of the selector B1007.

The broadcast signal selected in the selector B1007 is divided into two again.

One is delayed in the delay circuit B1026 and input to one input of the selector B1008. The other is output to the signal processor B1017 in the IC card B1003, where it is decrypted, then it is delayed in the delay circuit B1031 in the receiver main unit again, so as to be input to the other input of the selector B1008. The signal selected in the selector B1008 is inputted to a demultiplexer (referred to as DEMUX) B1009, where it is carried out the same operations as that in the conventional receiving apparatus.

In FIG. 21, it shows the cause of using the two IC cards, however, it can get the same effects in case of using even one or three IC cards. The terminal B1021 is connected with the external signal generator for supplying the broadcast signals to the receiver main unit B1001 from the outside, such as the recording reproducing apparatus like digital VTR. In FIG. 21, the signal is input to the terminal B1021, however, it may be input to the IC card terminal.

The delay circuit B1030 having the variable delay time is the circuit where the delay time (delay amount) using the shift register having the changeable tap is variable. Here the delay amount D2 is the difference between the delay amount D1 of the delay circuit B1023 and the delay amount D3 which is necessary for the IC card processing, and it is set meeting the following formula:

$$D1=D2+D3 \qquad (1)$$

Here, the delay time of the signal input to the selector B1007 via the IC card B1002 and the delay circuit B1030 and the signal input to the selector B1007 by bypassing the IC card B1002 are corresponding, that is, there is no any phase differences between them.

Further by recording the delay amount information B2033 generated in the processing inside of the IC card B1002 in the given area, it is read out from the IC card B1002 by the configuration carried out at the loading time of the IC card, so as to set the delay amount of the delay circuit B1030 by the control of the controller B1013.

Figure 25:
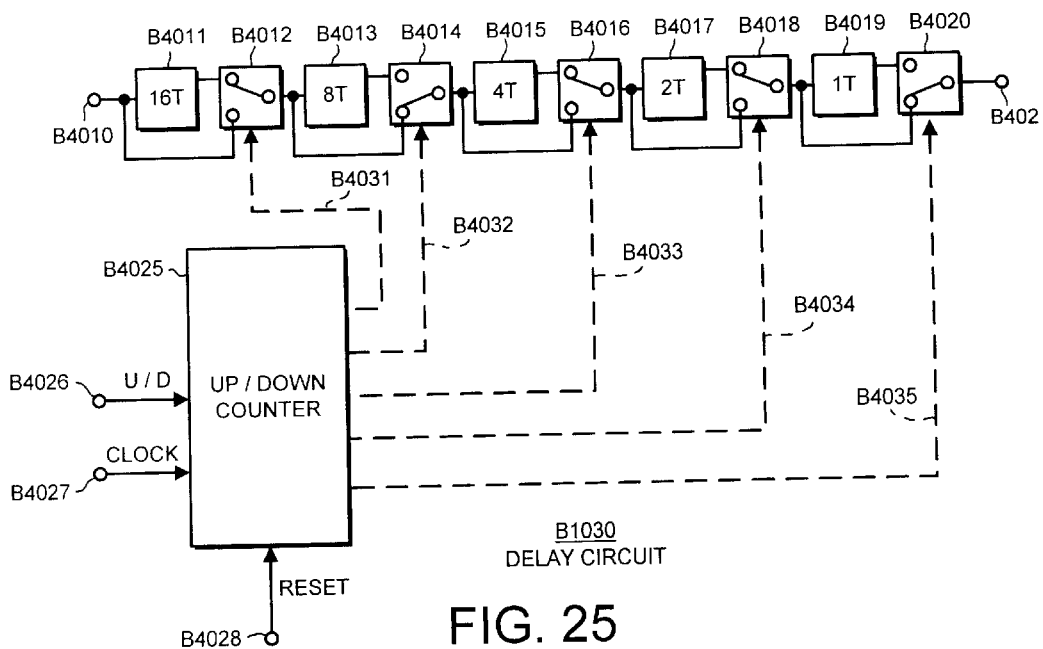
FIG. 25 is a block diagram for showing the delay circuit having the variable delay time in the first and second embodiments of the digital broadcast apparatus according to the third aspect of the present invention.
Figure 26:
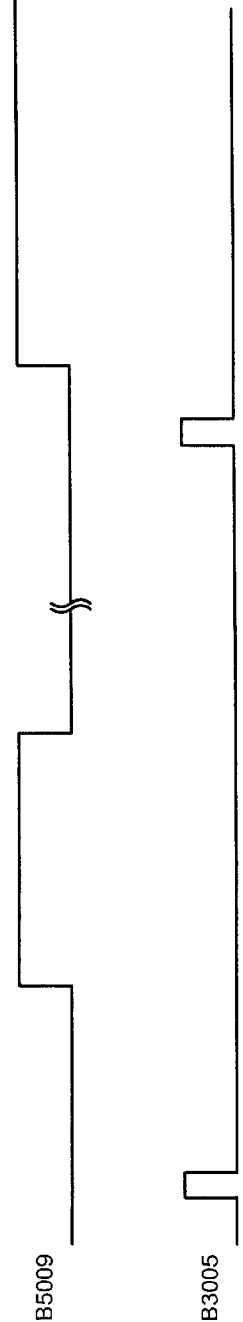
FIGS. 26(a) to 26(g) are timing charts for explaining the operations of a third embodiment of the digital broadcast apparatus according to the third aspect of the present invention.

FIG. 25 is a detail circuit showing the variable delay circuit that is applicable to the delay circuits B1030 and B1031. The variable delay circuit is comprised of the 16T delay circuit B2011 having the 16 steps shift register, the C8T delay circuit B4013 of C8 steps, the 4T delay circuit B4015 of 4 steps, and the 2T delay circuit B4017 of 2 steps and 1T delay circuit B4019 of 1 step, the two direction selectors B4012, B4014, B4016, B4018, and B4020, and 5 bits up down counter (hereinafter referred to as U/D counter) B4025. Here, 1T is the same time as the standard clock time inside the IC counter, and the delay time inside the IC card is the positive number times of the standard clock.

Then, by the U/D signal B4026 controlled by the controller B1013, the clock B4027, and reset signal B4028, the U/D counter B4025 is set to the voluntary value from 0 to 31, according to which the output signals B4031 through B4035 of the counter change each selector B4012 through B4020. So that, the delay signal is from 16T delay circuit B4011 to 1T delay circuit B4019 and these bypass signals are selected therein, and the delay time from the input terminal B4010 to the output terminal B4021 is voluntarily set among delay times from 0T to 31T.

FIGS. 23(a) to 23(e) shows examples of the broadcast signal streams input to the selector B1007, and the case that the three program signals from the program 1 to the program 3 are packeted and time division multiplexed.

It is assumed that the program 1 in the stream is the subscription TV program and other programs 2 and 3 are free program signals, here only the program 1 is encrypted.

In the case, as explained in the conventional embodiment, only the packet of the program 1 is carried out the signal processing in the signal processor B1016 inside the IC card B1002, and others are not, so as to be output to the receiver main unit B1001.

In FIG. 23(a), B3001 means the output of the delay circuit B1023 and the B3002 means the output of the delay circuit B1030. As mentioned above, each delay amounts of the delay circuits are set, and the phase differences between the signals input from the delay circuit will be nothing in the selector B1007.

Figure 28:
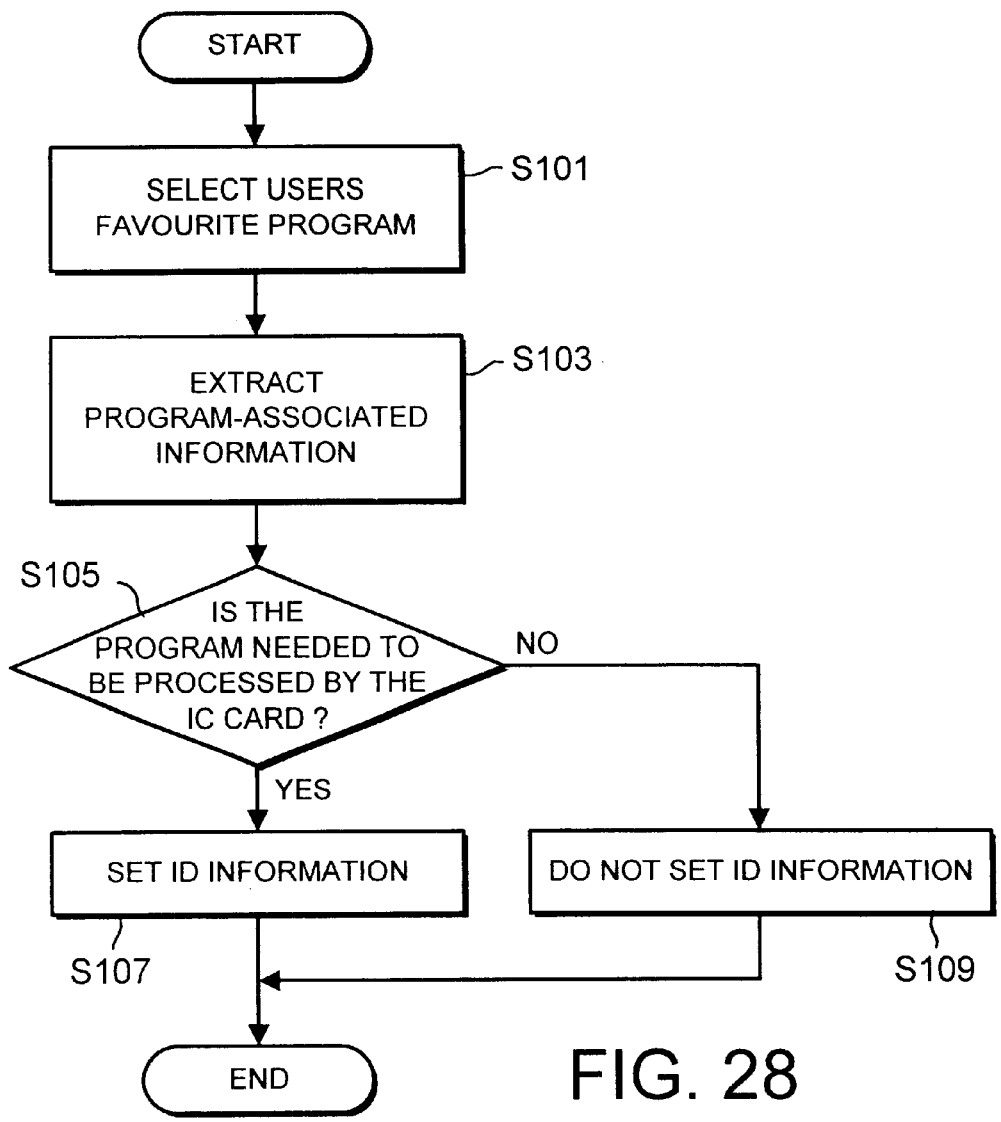
FIG. 28 is a flow chart for explaining the operation of the program information identifier in the first embodiment of the digital broadcast receiver according to the third aspect of the present invention.

FIG. 28 is a operation chart explaining the operation of the program information identifier B1029 of the first embodiment. First, a user's favorite program signal is selected in the program selector B1020 (step S101), then, the multiplexed program-associated information in the broadcast signal is extracted in the program information identifier B1029, so as to obtain the identification information for identifying the packets from the program 1 to program 3 and the information showing the kind of the programs 1 to 3 (for instance, if it is the subscription TV program or the free TV program) (step S103).

Now, these program signals are determined from the program-associated information whether if they are to be decrypted in the IC card (step S105). In this case, it is determined that only the program 1 is the subscription TV program and the packet which is carried out in the signal processor B1016 inside the IC card B1002. Then, the identification information of the program 1 is set in the header information detector B1025 in order to generate the detection signal to the packet having the identification information showing the program 1 (step S107). If the program signal does not require the processing in the IC card, the identification information is not set (step S109).

To the header information detector B1025, either of the outputs from the delay circuits B1023 or B1030 is input (FIG. B shows that the output from the delay circuit B1030 is input), then the header of the packets in the stream is analyzed and the packet applied to the identification information is detected, so that the detection signal like a signal B3005 in FIG. 23(e) is output to the timing generator B1024.

In the timing generator B1024, the signal which only the term of the packet applied to the signal B3005 will be H (activated) like the signal B3004, shown in FIG. 23(d), is output as the control signal of the selector B1007.

Further, the selector B1007 selects the signal A when the control signal is L (non active) and selects signal B when the control signal is H, and only the packet of the program 1 is selected from the stream of B3002 and other program signals are selected from the stream of B3001, so that the stream such as B3003 is obtained as the output of the selector B1007.

Accordingly, by controlling the selector B1007 selectly in each packets, even the IC card B1002 is removed while the program 2 or 3 is viewed, it does not have any bad influences on the following IC card, video or audio signals of the program signal on viewing or other operations in the receiving apparatus.

Further, in the same way to the IC card B1003 the circuit for the operation mentioned above is connected. Here, the delay circuit B1026 performes the same function as the B1023, the delay circuit B1031 is same as the B1030, the timing generator B1027 is same as the B1024, and the header information detector B1028 is same as the B1025.

Furthermore, among the IC cards such as decryptor, some of them supply the processing result of the broadcast signal input from the receiver main unit to the receiver main unit again as the output broadcast signal, and others outputs the extracted character code information to the controller B1013 in the different way (not shown) not outputting the processing signal to the input broadcast signal such as the teletext signal as the broadcast signal.

So that, by defining the attribute information memories B1035 and B1034 inside each IC card B1002 and B1003 on the memory for instance, and communicating to the controller B1013 in the receiver main unit via the controllers B1018 and B1019 inside the IC card, the attribute information of each IC card is transmitted to the receiver main unit.

Here the attribute means that the IC card only reads the signal or rewrites it. If the attribute of the IC card is only reading of the signal, it does not need to select the broadcast signal output, and to change the selectors B1007 and B1008, so that the controller B1013 controls to deactivate the detection of the header information over the header information detectors B1025 and B1028, and the selectors B1007 and B1008 control to select the IC bypass side. Accordingly, since the changing of the selectors is not always carried out in this case, more certain operation will be carried out.

Figure 22:
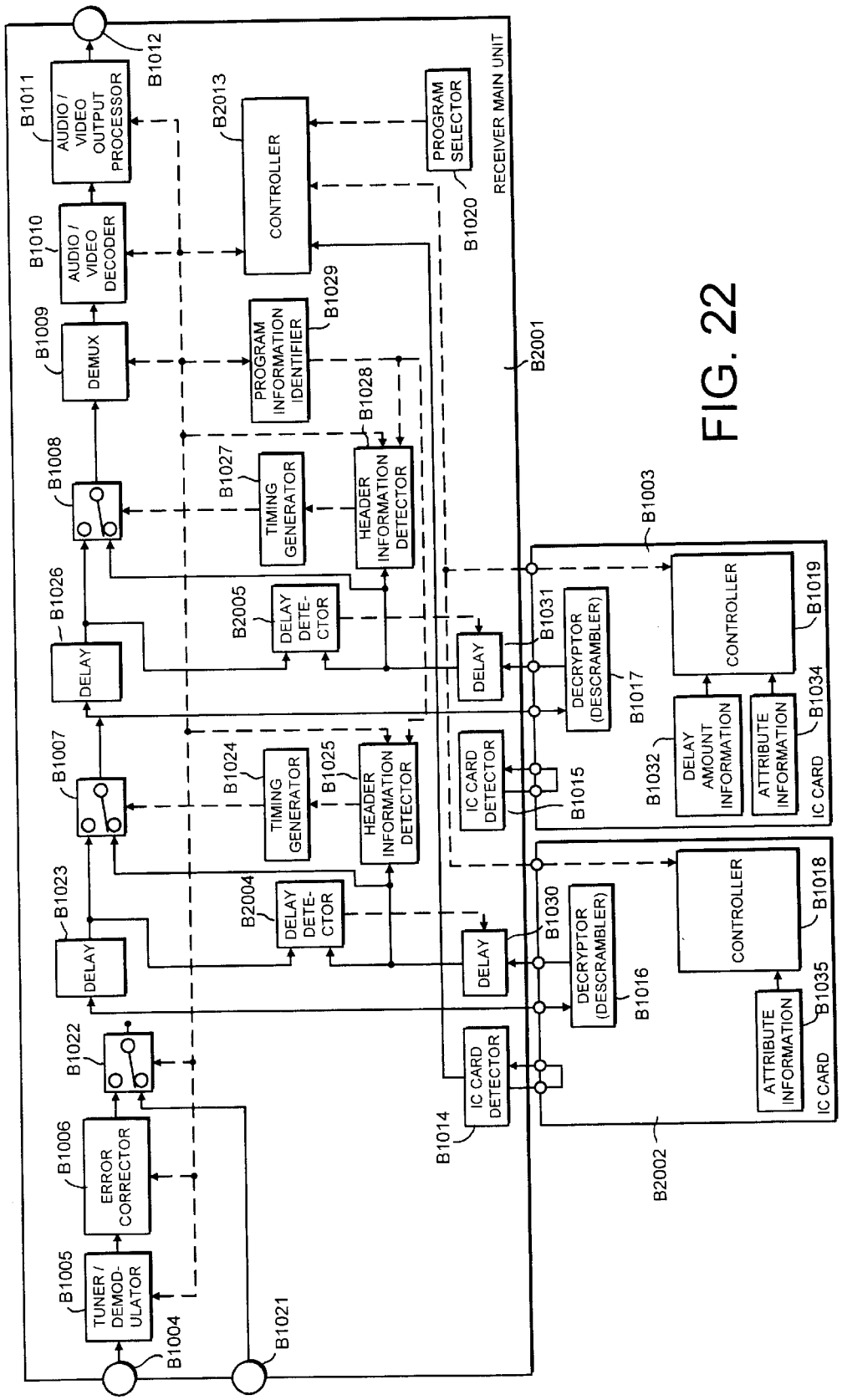
FIG. 22 is a block diagram showing a second embodiment of the digital broadcast receiver according to the third aspect of the present invention.

FIG. 22 is a block diagram showing the second embodiment of the digital broadcast receiver according to the present invention. In FIG. 22 the same components as those in the first embodiment are assigned with the same symbols and the explanation thereof will be omitted in the folowing description.

In FIG. 22, the digital broadcast receiver according to the present invention is comprised of the receiver main unit B2001, which embodies the first apparatus, and the IC cards B2002 and B2003, which embody the second apparatus, removably coupled to the receiver main unit 2001.

The receiver unit B2001 further includes delay detectors B2004 and B2005, in different from the first embodiment, as shown in FIG. 21. Here, the difference between the IC card B2002 and the IC card B1002, as shown in FIG. 21, is that the IC card B2002 is not provided with the delay amount information memory B1003. Further, it may use the IC card which is not have the delay amount information memory in the same way in place of the ID card B1003.

In the first embodiment, descriptions have been made in relation to the example that the IC cards are provided with delay information memories B1033 and B1034, and then the delay circuits B1030 and B1031 are set their delay amounts in reliance to the delay information memories B1033 and B1034. However in the second embodiment, it is explained that there is not such a delay amount information inside the IC card.

To the delay detector B2004 the output of the delay circuits B1023 and B1030 is input, from which stream the synchronizing signal is detected, so as to detect if which phase is proceeded (or delayed).

Figure 24:
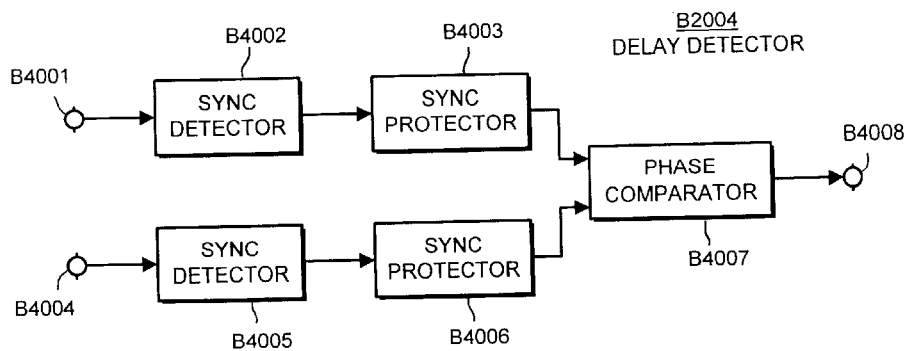
FIG. 24 is a block diagram for showing the delay detector in the second embodiment of the digital broadcast apparatus according to the third aspect of the present invention.

FIG. 24 is a block diagram showing the delay detector B2004. The delay detector B2004 is comprised of synchronizing detectors B4002 and B4005 for detecting the synchronizing signal out of the input stream, synchronizing protectors B4003 and B4006 for preventing the error synchronization, and a phase comparator B4007 for outputting the signal corresponding to the phase differences. Then, the delay amount of the delay circuit B1030 is adjusted by the output of the phase comparator B4007, and the phase difference of the stream B3001 and B3002, as shown in FIGS. 23(a) through 23(b), which are input to the selector B1007. Accordingly, an advantage the same as that in the first embodiment is obtained by operations the same as the first embodiment.

The adjustment of the delay time of the delay circuit B1030 at that time is easily adjusted in the delay circuit providing the up down counter B4025, as shown in FIG. 25. That is, it makes the signal which is turned over the phase accordance signal supplied from the phase comparator B4007, as shown in FIG. 24, as the enabling signal to the clock B4027, and the signal showing which result of the phase comparator is proceeded is connected to the up/down signal (U/D) B4026.

Accordingly, when the output phase of the delay circuit B1030 is proceeded the delay time is increased by count up the U/D counter B1025, but when the output phase of the delay circuit B1023 is proceeded the delay time is decreased by count down the U/D counter B4025, so as to correspond the phases of the outputs from the delay circuits B1023 and B1030. In the same way, the delay detector B2050 can correspond the phase of the outputs from the delay circuit B1026 and delay circuits B1031 without the delay amount information memory B1032 inside the IC card B1003.

FIGS. 26(a) to 26(g) are timing charts for explaining the third embodiment of the digital broadcast receiver according to the present invention. In FIGS. 26(a) and 26(b), the streams B5001 and B5002 are outputs of the delay circuits B1023 and B1030, as shown in FIGS. 21 and 22, respectively. In the stream of the MPEG system there is the reproducing of the receiving apparatus, which is normally not encrypted.

In the header information detector B1025, the detection output of the packet having the identification information which is set by the program information identifier B1029 and information indicating the presence/absence and the length of the adaptation field to the packet are output to the timing generator B1024.

In the timing generator B1024 the selection signal B5009 is generated by the signal B3005 showing the identification signal detection, the signal B5007 showing the adaptation field detection, and the signal B5008 showing the length of the adaptation field. The stream B6006 is the detailed contents of the program 1 in the B5002 for this explanation. When the synchronizing reproducing control signal of the packet of the program 1 which is processed by the IC card is transmit to inside the adaptation field, the selection signal B5009 is generated to select only the payload where the information of the program 1 are multiplexed.

According to such a construction, even if reference signals for restoring synchronization are multiplexed to the packet which is to be processed in the IC card, it does not cause problems of a loss of synchronization caused by the unloading of the IC card.

Figure 27:
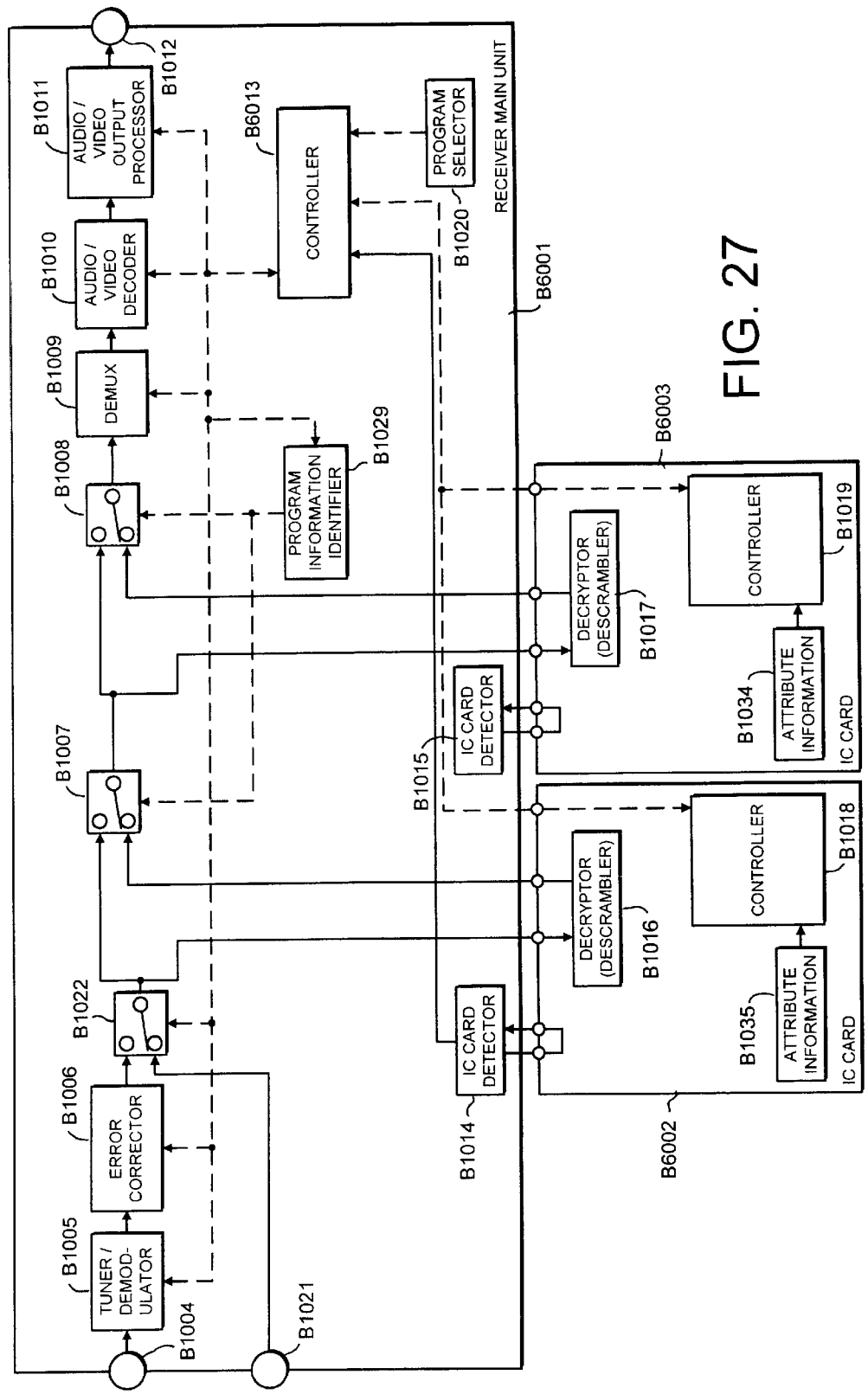
FIG. 27 is a block diagram showing a fourth embodiment of the digital broadcast receiver according to the third aspect of the present invention.

FIG. 27 is a block diagram showing the fourth embodiment of the digital broadcast receiver according to the present invention. In FIG. 27, the same components as those in FIG. 1 are assigned with same symbols, and the duplicated explanation will be omitted in the folowing description.

In FIG. 27, the digital broadcast receiver of the present invention is comprised of the receiver main unit, which embodies the first apparatus, and the IC cards B6002 and B6003, which embodies the second apparatus, removably coupled to the receiver main unit B6001.

In the receiver main unit B6001, the input terminal B1021, the selector B1022, the program information identifier B1029, and the program selector B1020 are further comprised, in comparison to the conventional receiver main unit A101, as shown in FIG. 1. Here the function of the controller B6013 differs from that of the conventional receiver main unit B9901.

Further, the differences between the IC card B6002 and B6003 and the IC cards B9002 and B9003, as shown in FIG. 1, are that the IC cards B6002 and B6003 are provided with the attribute information memories B1035 and B1034.

Figure 29:
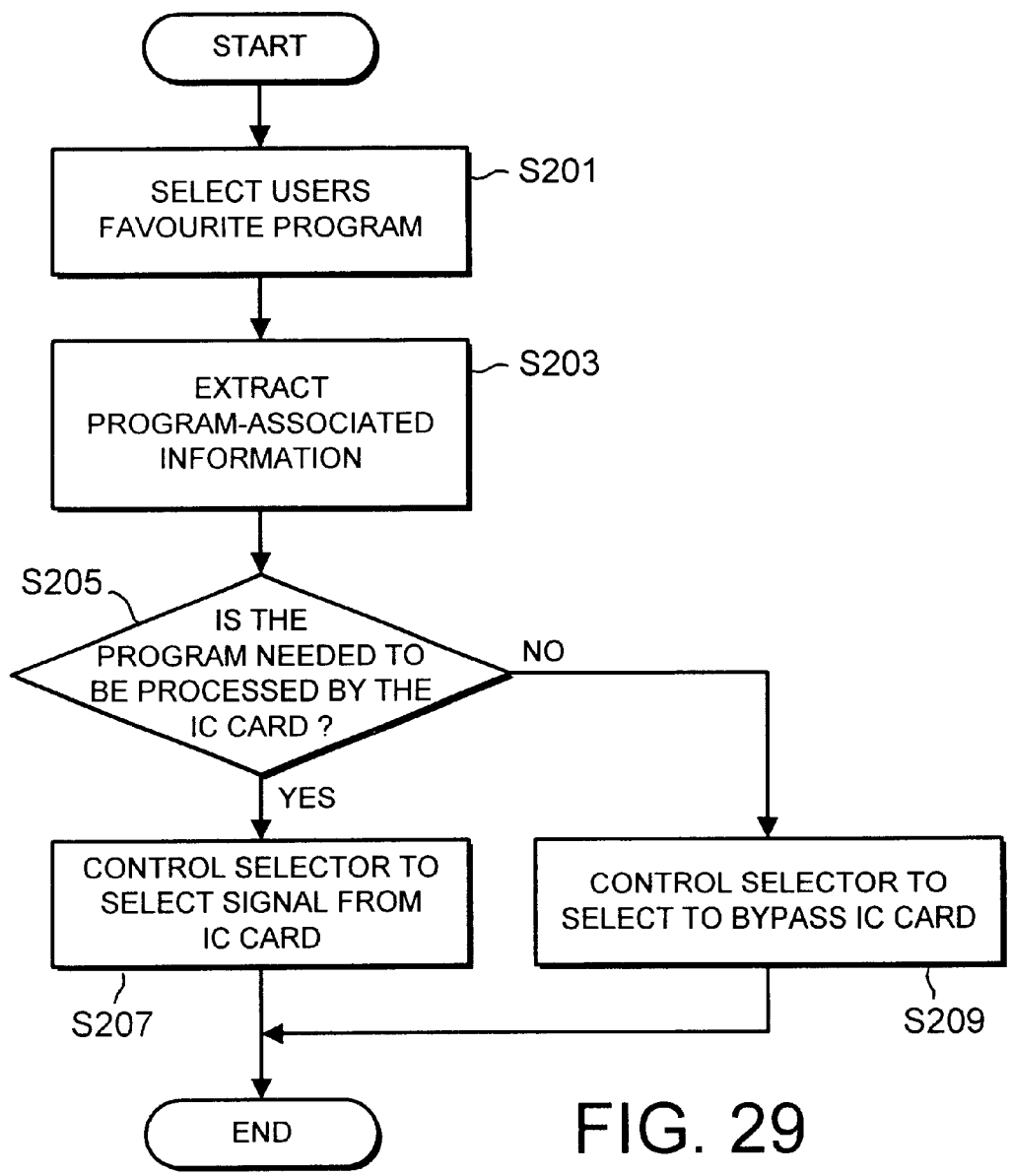
FIG. 29 is a flow chart for explaining the operation of the program information identifier in the third embodiment of the digital broadcast receiver according to the third aspect of the present invention.

In FIG. 27, the program information identifier B1029 extracts the multiplexed program-associated information among the broadcast signals, as shown in the flow chart of FIG. 29, like the first embodiment, to obtain the information to the program signal which is selected by the user (step S203). Then based on the information, it determines if the processing in the IC card is needed or not (step S205). If it determines that the processing is needed, it changes the selectors B1007 and B1008 to select the IC card side (step S207), however, if it determines that the processing is not needed it changes these selectors to select the IC card bypass side (step S209).

For instance, in the case that the program signal selected by the user is the subscription TV program and it requires the processing in the IC card B6002, it changes the selector B1007 to select the output of the IC card and changes the selector B1008 to select the IC card B6003 bypass side. However, in the case that the program signal selected by the user is the free TV program and it does not require the processing in the IC card, it controls the selectors B1007 and B1008 to selection control signal for bypassing the IC card.

Accordingly, by changing the selectors to select the output of the IC card when the user selects the program signal which requires the processing in the IC card, it can prevent the bad influences caused by unloadings of the IC card in minimum.

Figure 30:
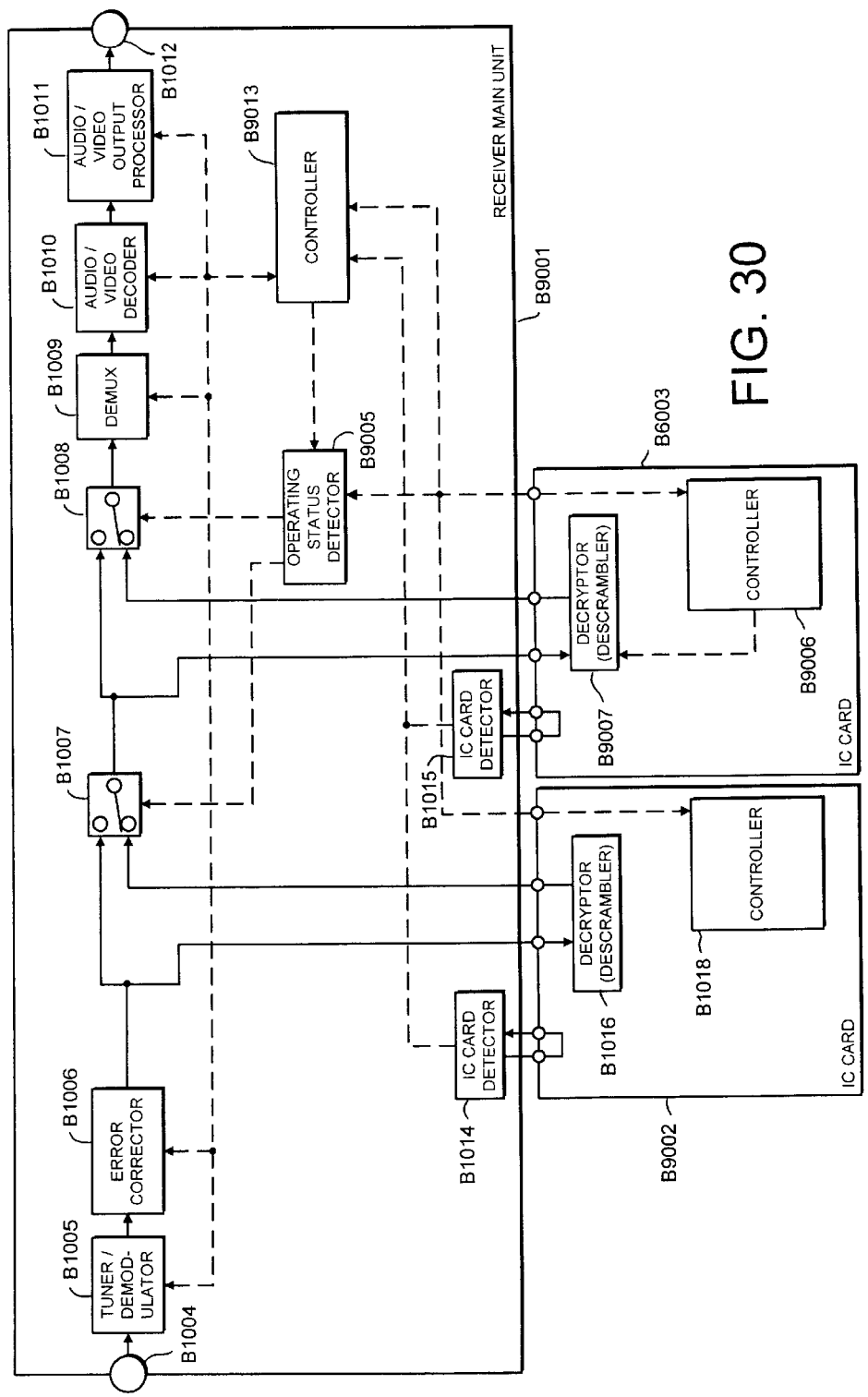
FIG. 30 is a block diagram showing the fifth embodiment of the digital broadcast receiver according to the third aspect of the present invention.

FIG. 30 is a block diagram showing the fifth embodiment of the digital broadcast receiver according to the present invention. In FIG. 30, the same components as those, as shown in FIG. 1, are assigned with same symbols, and duplicated explanations will be omitted in the folowing description.

In FIG. 30, the digital broadcast receiver according to the present invention is comprised of the receiver main unit B9001 which is the first apparatus, the IC card B9002 which is the second apparatus removable to the receiver main unit B9001, and a recording/reproducing unit B9004.

The recording/reproducing unit B9004, which is connected with the IC card interface same as the IC card interface, has the recording medium B9007 which is possible to record and reproduce and the controller B9006. The controller B9006 can communicates the operation status information such as the recording, and reproducing,, the feeding forward, or rewinding.

In the receiver main unit B9001, the operation status detector B9005 is further comprised, in comparison to the conventional receiver main unit B9001, as shown in FIG. 1. And the function of the controller B9013 differs from that of the conventional receiver main unit B9901.

The operation status detector 9005, which is the circuit for detecting the operation status of the IC card connected to, or other connecting apparatus (e.g., record media, teletext receivers, or personal computers, etc), controls the selectors B1007 and B1008 to select the output of the IC card or the connecting apparatus side in the case that the apparatus connected to outputs the signal in the operation status, for instance, in the reproducing status.

For instance, when there is no contact for the program signal which requires the signal processing in the IC card B9002, only the contact of the membership is made between the controllers B1018 and B9013, and the selector B1007$n$ is controlled to select the IC card bypass side.

Further, it is as same as the case that other external apparatus is connected. For instance, if the recording/reproducing unit B9004 would be coupled to the conventional one of the digital broadcast receiver, the selector B1008 operates independently from the status is connected, the conventional apparatus controls the selector B1008 without relying to the operation status, and it selects this output even if the record media is not operated.

However, according to the communication of the controller B9006 and the operation status detector B9005 of the present invention it detects the operation status of the recording/reproducing unit B9004, and controls the selector B1008 to select the reproducing output only when the data stored from the recording medium B9007 are reproduced.

So that, it never selects the output signal of the external connecting apparatus unpreparedly in the case that the external connecting apparatus is not operated.

Here, these embodiments mentioned above are some examples of the present invention. So, for instance two IC cards the first IC card A3 and the second IC card 4 are possible to be put on the receiver main unit. However, either one or three IC cards may be put on it. Further, the present invention can also be adapted for many applications without departing from the principle of present invention according to the designs.

As described above, the present invention has such an effect to be able to prevent signals appearing at the IC card interface between the receiver main unit and IC cards from being used without authorization.

The digital broadcast receiver according to the present invention is possible to prevent the malfunction of the following stage of the selector for selecting the broadcast signal which is carried out the signal processing in the signal processor and the broadcast signal which is not carried out the signal processing. Further, if it has several signal processor which is connected to the daisy-chain fashion, it can also prevent the malfunction in the signal processor.

As mentioned above according to the present invention, since it identifies the several data among the broadcast signals into them which require the processing in the IC card and them which do not, and changes the data unit of the data stream processed in the IC card and the stream bypassing the IC card to the above-described data units, it can guarantee the input data of the IC card which is connected in the daisy-chain fashion to the following stage even if the IC card is removed from the receiver main unit, so that it can prevent the malfunction generated in the processor inside the IC card which is connected to following or the receiving apparatus.

As described above, the present invention can provide an extremely preferable digital broadcast receiver.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A digital broadcast receiver comprising:

a first unit for receiving broadcast signals transmitted from a transmitter;

a second unit capable of removably coupling to the first unit for applying an operation specific to the second unit to a received signal;

an encryptor equipped in the first unit for encrypting the received signal and for providing the encrypted signal to the second unit; and a decryptor equipped in the first unit for decrypting the signal encrypted by the encryptor transferred through the second unit, wherein said encryptor is provided with a packet-shuffling unit for shuffling packets in packetized transport stream of broadcast signals; and said decryptor is provided with a packet-deshuffling unit for deshuffling the packets shuffled by said packet-shuffling unit.

2. A digital broadcast receiver comprising:

a first unit for receiving broadcast signals transmitted from a transmitter;

a second unit capable of removably coupling to the first unit for applying an operation specific to the second unit to a received signal;

an encryptor equipped in the first unit for encrypting the received signal and for providing the encrypted signal to the second unit; and a decryptor equipped in the first unit for decrypting the signal encrypted by the encryptor transferred through the second unit, wherein said encryptor is provided with a stream-encryptor or a block-encryptor for stream-encrypting or block-encrypting broadcast signals; and said decryptor is provided with a stream-decryptor or a block-decryptor for resetting said stream-encryption or said block-encryption processed in the encryptor.

3. A digital broadcast receiver comprising:

a first unit for receiving broadcast signals transmitted from a transmitter;

a second unit capable of removably coupling to the first unit for applying an operation specific to the second unit to a received signal;

an encryptor equipped in the first unit for encrypting the received signal and for providing the encrypted signal to the second unit; and a decryptor equipped in the first unit for decrypting the signal encrypted by the encryptor transferred through the second unit, wherein said encryptor is provided with a detector to detect identification information for identifying packets contained in broadcast signals; and based on the detected result of said detector, it is decided whether encryption is applied to said broadcast signals by a unit of packet-basis, or encryption format is changed.

4. A digital broadcast receiver as claimed in claim 1, wherein said encryptor applies stream encoding or block encoding to information indicating a packet sequence included in broadcast signals.

5. A digital broadcast receiver as claimed in claims 1 through 4, wherein encryption format is changed at an arbitrary period.

* * * * *